United States Patent [19]

Hilakos

[11] Patent Number: 5,395,603
[45] Date of Patent: Mar. 7, 1995

[54] AUTOMATIC CONTROL SYSTEM FOR A CHEMICAL PROCESS, ESPECIALLY A WET PROCESS PHOSPHORIC ACID PLANT

[75] Inventor: Stephen W. Hilakos, Valrico, Fla.

[73] Assignee: IMC Fertilizer, Inc., Northbrook, Ill.

[21] Appl. No.: 49,383

[22] Filed: Apr. 21, 1993

[51] Int. Cl.⁶ .............................................. C01B 25/16
[52] U.S. Cl. .................................. 423/320; 210/740; 210/772; 423/157.4
[58] Field of Search .............................. 423/157.4, 320; 210/768, 772, 740, 758, 765, 805, 806

[56] References Cited

U.S. PATENT DOCUMENTS

| | | |
|---|---|---|
| 3,086,849 | 4/1963 | Goldsmith . |
| 3,104,946 | 9/1963 | Veal . |
| 3,130,187 | 4/1964 | Tolin et al. . |
| 3,309,507 | 3/1967 | Schlein . |
| 3,348,682 | 10/1967 | Aulich et al. ........... 210/740 |
| 3,594,557 | 7/1971 | Anderson . |
| 4,108,957 | 9/1978 | Michel . |
| 4,188,366 | 2/1980 | Houghtaling . |
| 4,226,714 | 10/1980 | Furness et al. ........... 210/740 |
| 4,332,590 | 6/1982 | Smith . |
| 4,358,827 | 11/1982 | Abbott . |
| 4,402,923 | 9/1983 | Lang . |
| 4,485,078 | 11/1984 | Weston et al. . |
| 4,501,724 | 2/1985 | Goers . |
| 4,543,637 | 9/1985 | Smith et al. . |
| 4,616,308 | 10/1986 | Morshedi et al. . |
| 4,777,027 | 10/1988 | Davister et al. . |

FOREIGN PATENT DOCUMENTS

| | | | |
|---|---|---|---|
| 135509 | 5/1989 | Japan | ........... 210/740 |
| 597632 | 3/1978 | U.S.S.R. | . |
| 764702 | 9/1980 | U.S.S.R. | ........... 210/740 |
| 1112025 | 9/1984 | U.S.S.R. | . |
| 1411276 | 7/1988 | U.S.S.R. | . |

*Primary Examiner*—Wayne Langel
*Attorney, Agent, or Firm*—Banner, Birch, McKie & Beckett

[57] ABSTRACT

Maximum throughput of a wet process phosphoric acid plant at a fixed recovery can be obtained by controlling the filter feed to give a desired specific gravity of the filtrate from the last washing of the gypsum cake. The filtrate from the last washing of the gypsum cake also is called the first pass filtrate. The specific gravity of this first pass filtrate provides an indication of the overall filter efficiency and the loss of water-soluble phosphoric acid to the gypsum waste stream. The specific gravity of the first pass filtrate is controlled by adjusting the rate at which product slurry from the attack tank is fed to the filter. This product slurry feed rate is affected by the mechanical performance of the filter and the filterability of the gypsum crystals, which, in turn, is affected by operating conditions in the attack tank. Therefore, the feed rates of phosphate rock, sulfuric acid, and water, are controlled to produce the desired attack tank operating conditions and to maintain attack tank level. Each of the primary processing steps, i.e., operation of the attack tank and operation of the filter, is controlled to maximize plant efficiency. By minimizing phosphoric acid loss and optimizing operation of the attack tank in accordance with the invention, plant efficiency is maximized.

9 Claims, 15 Drawing Sheets

FIG. 5

DEVIATION CONTROL EXAMPLE

| | | |
|---|---|---|
| DEVIATION TIME = 0.0 | DEVIATION = 210.00 | ADJUSTMENT = 0.0 |
| DEVIATION TIME = 1.0 | DEVIATION = 207.70 | ADJUSTMENT = 4.2 |
| DEVIATION TIME = 2.0 | DEVIATION = 201.35 | ADJUSTMENT = 8.1 |
| DEVIATION TIME = 3.0 | DEVIATION = 191.31 | ADJUSTMENT = 11.5 |
| DEVIATION TIME = 4.0 | DEVIATION = 178.16 | ADJUSTMENT = 14.4 |
| DEVIATION TIME = 5.0 | DEVIATION = 162.59 | ADJUSTMENT = 16.4 |
| DEVIATION TIME = 6.0 | DEVIATION = 145.42 | ADJUSTMENT = 17.7 |
| DEVIATION TIME = 7.0 | DEVIATION = 127.45 | ADJUSTMENT = 18.1 |
| DEVIATION TIME = 8.0 | DEVIATION = 109.46 | ADJUSTMENT = 17.8 |
| DEVIATION TIME = 9.0 | DEVIATION = 92.12 | ADJUSTMENT = 16.9 |
| DEVIATION TIME = 10.0 | DEVIATION = 75.96 | ADJUSTMENT = 15.5 |
| DEVIATION TIME = 11.0 | DEVIATION = 61.38 | ADJUSTMENT = 13.8 |
| DEVIATION TIME = 12.0 | DEVIATION = 48.58 | ADJUSTMENT = 11.9 |
| DEVIATION TIME = 13.0 | DEVIATION = 37.68 | ADJUSTMENT = 10.1 |
| DEVIATION TIME = 14.0 | DEVIATION = 28.63 | ADJUSTMENT = 8.2 |
| DEVIATION TIME = 15.0 | DEVIATION = 21.31 | ADJUSTMENT = 6.6 |

FIG. 7

SULFATE CONTROL EXAMPLE CALCULATIONS

| | | | | | | | | | | |
|---|---|---|---|---|---|---|---|---|---|---|
| TARGET | 1.90 | 1.90 | 1.90 | 1.90 | 1.90 | 1.90 | 1.90 | 1.90 | 1.90 | 1.90 |
| MEASURED $SO_4$ | 1.90 | 1.85 | 1.95 | 3.00 | 1.70 | 1.72 | 1.65 | 1.71 | 1.76 | 1.85 |
| TIME OF ENTRY | 11:55 | 1:08 | 2:12 | 3:02 | 4:21 | 5:16 | 6:07 | 7:15 | 8:22 | 9:23 |
| TIME OF SAMPLE | 11:45 | 12:52 | 2:00 | 2:54 | 4:02 | 5:04 | 5:54 | 7:02 | 8:16 | 9:07 |
| MINUTES BETWEEN ENTRIES | | 73 | 64 | 50 | 79 | 55 | 51 | 68 | 67 | 61 |
| SAMPLE DELAY IN MINUTES | 10 | 16 | 12 | 19 | 9 | 12 | 13 | 13 | 5 | 16 |
| TOTAL $H_2SO_4$ (GALLONS) | | 36865 | 32423 | 25157 | 37633 | 28184 | 26162 | 35000 | 34413 | 31302 |
| AVERAGE $H_2SO_4$ (GPM) BETWEEN SAMPLE TIMES | 505.00 | 505.00 | 506.60 | 503.14 | 476.36 | 512.44 | 512.97 | 514.71 | 513.62 | 513.16 |
| TOTAL ROCK (DRY TONS) | | 21900 | 19200 | 15000 | 23700 | 16500 | 15300 | 20400 | 20100 | 18300 |
| AVERAGE ROCK (DTPH) BETWEEN SAMPLE TIMES | 300 | 300 | 300 | 300 | 300 | 300 | 300 | 300 | 300 | 300 |
| OFFSET TO RATIO | 25 | 25 | 25 | 25 | 25 | 25 | 25 | 25 | 25 | 25 |
| ACID EXCESS | | .00 | 92.43 | -90.62 | -2069.38 | 390.34 | 285.25 | 437.24 | 332.63 | 254.38 |
| CALC ACID | | -92.00 | 184.00 | 1927.54 | -2376.40 | 73.38 | -157.36 | 82.44 | 72.34 | 159.42 |
| THEORY ACID | | .00 | 4.85 | -16.93 | -39.64 | 30.92 | 30.24 | 21.24 | 6.68 | 22.32 |
| ADD ACID | | .00 | 87.58 | -73.69 | -2049.74 | 359.43 | 255.00 | 416.00 | 325.95 | 232.06 |
| BASE $SO_4$ | | 1.85 | 1.91 | 3.04 | 2.73 | 1.54 | 1.52 | 1.50 | 1.60 | 1.74 |
| PREDICTED $SO_4$ | 1.90 | 1.85 | 1.95 | 2.99 | 1.68 | 1.74 | 1.67 | 1.72 | 1.76 | 1.86 |
| $ExSO_4$ | | 1.90 | 1.90 | 1.91 | 1.94 | 1.88 | 1.88 | 1.89 | 1.89 | 1.89 |
| UP COUNTS | .00 | .00 | .00 | 1.00 | .00 | 1.00 | 2.00 | 3.00 | 4.00 | 5.00 |
| DOWN COUNTS | .00 | 1.00 | 2.00 | .00 | 1.00 | .00 | .00 | .00 | .00 | .00 |
| COMBINATION FACTOR | .000 | .000 | .025 | .050 | .225 | .300 | .190 | .215 | .220 | .165 |
| GAIN FACTOR | 1.000 | .999 | .998 | .997 | .996 | .995 | .994 | .993 | 1.017 | 1.041 |
| ACTUAL RATIO | 1.500 | 1.604 | 1.596 | 1.465 | 1.605 | 1.520 | 1.637 | 1.628 | 1.625 | 1.518 |
| HISTORIC RATIO | 1.500 | 1.601 | 1.600 | 1.599 | 1.600 | 1.603 | 1.605 | 1.608 | 1.610 | 1.611 |
| SET RATIO | 1.600 | 1.601 | 1.600 | 1.593 | 1.601 | 1.608 | 1.611 | 1.612 | 1.613 | 1.512 |
| K VALUE | .000 | 4.480 | -4.692 | -97.601 | 19.641 | 14.678 | 20.932 | 15.970 | 12.463 | 3.544 |

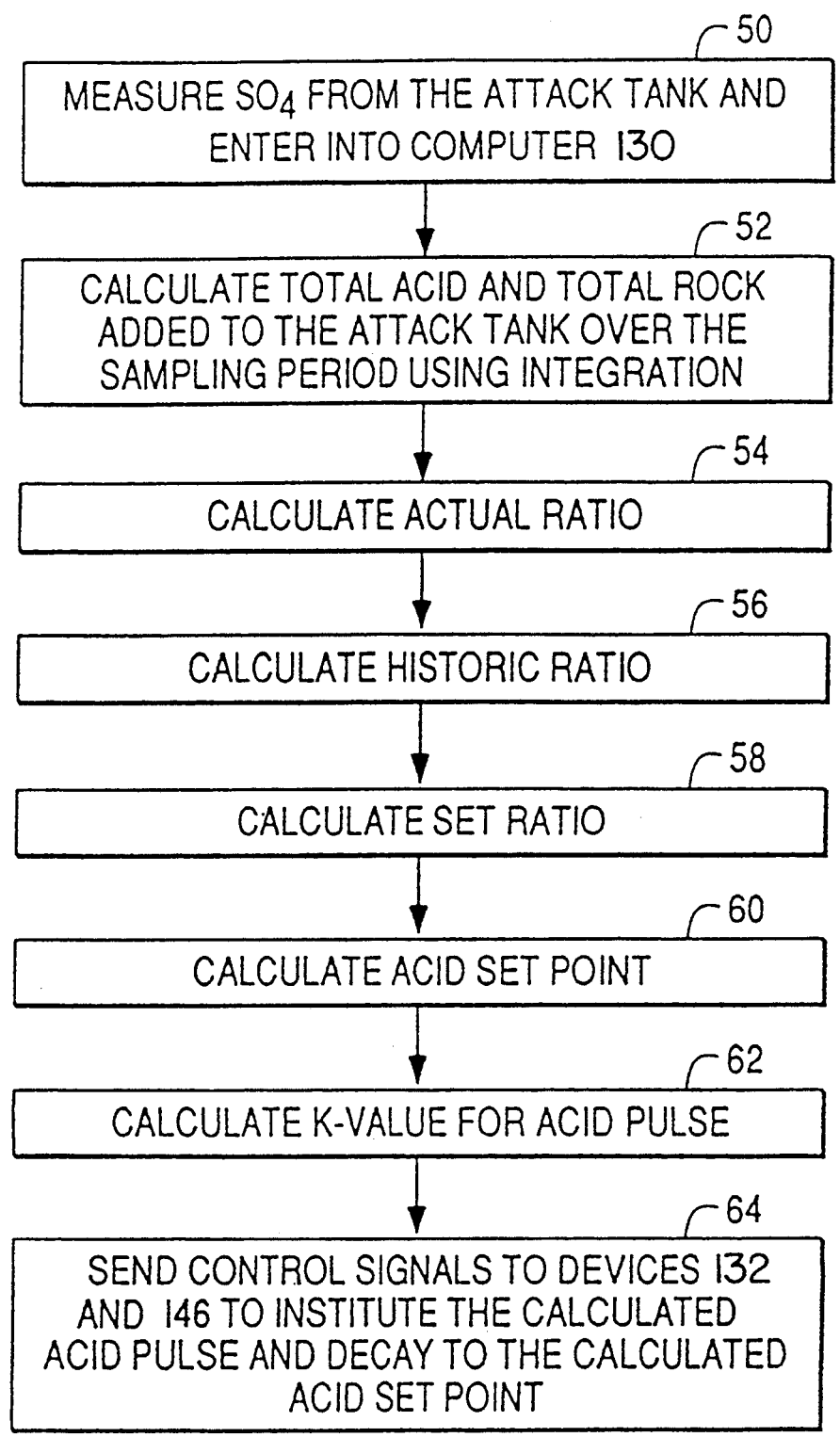

AUTOMATIC CONTROL SYSTEM FOR A CHEMICAL PROCESS, ESPECIALLY A WET PROCESS PHOSPHORIC ACID PLANT

BACKGROUND OF THE INVENTION

1. Field of the Invention

The present invention generally relates to an automatic control system for controlling a chemical process in order to maximize efficiency. More particularly, the invention relates to an automatic control system for controlling the operation of a phosphoric acid recovery plant in order to maintain constant efficiency.

Phosphoric acid ($H_3PO_4$) is an important intermediate chemical product. It is used primarily by the fertilizer industry, but also is useful in a number of other areas such as in detergents, water treatment, and food products.

2. Description of Related Art

The most common method for producing phosphoric acid is known in the art as the "wet process." Using the wet process, phosphate rock, which comprises calcium and phosphorus, typically in the form $Ca_3PO_4$, together with a number of impurities, is mined, beneficiated, and comminuted. Typically, ball mills or rod mills are used to obtain the desired size distribution. Grinding can be carried out by a wet or dry process; wet processing is typical. The ground rock then is fed, typically as an aqueous slurry, to a reactor, or "attack tank", and reacted with sulfuric acid. The process is represented by the following equation:

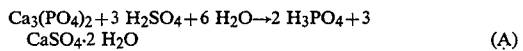

$$Ca_3(PO_4)_2 + 3\, H_2SO_4 + 6\, H_2O \rightarrow 2\, H_3PO_4 + 3\, CaSO_4 \cdot 2\, H_2O \quad \text{(A)}$$

The phosphoric acid thus produced remains in aqueous solution; calcium sulfate, commonly referred to as gypsum, is a crystalline solid under reaction conditions. A simplified flow diagram of a wet process phosacid plant, including sulfuric acid manufacture, is illustrated in FIG. 1.

Although phosphoric acid is represented as $H_3PO_4$, plant output most often is measured in tons of $P_2O_5$, or phosphorous pentoxide. Approximately 4 tons of 30% phosphoric acid aqueous solution is equivalent to about 1 ton of $P_2O_5$. It also is common in the trade to use the terms "phosphorous pentoxide" and "phosphoric acid" interchangeably when referring to plant output. "Phosacid" is a short form for phosphoric acid, typically in aqueous solution.

The operator of a phosphoric acid plant typically seeks to maximize the production of phosphoric acid from the limited amount of phosphate rock, thus minimizing any potential losses of phosphoric acid. To minimize cost, the operator must maximize overall plant efficiency. An important factor influencing the efficiency of a phosphoric acid plant is the amount of free or excess sulfate ($SO_4^=$, measured as weight percent of excess sulfate) in the reactor or attack tank. The amount of excess sulfate constitutes the amount of sulfate not reacted with calcium or in the form of $CaSO_4$. On this basis, "excess sulfate" may have either a positive or a negative value (positive representing an excess of sulfate, and negative representing a deficiency of sulfate).

The reaction shown in Equation A produces two chemical products: phosphoric acid and calcium sulfate crystals (gypsum—a co-product). A properly operating phosphoric acid plant results in high $P_2O_5$ recovery from the attack tank slurry and the formation of calcium sulfate crystals that contain little unreacted phosphate and have a shape, size, and porosity affording easy separation from the liquid by filtration. Level of excess sulfate is one of the most important factors governing crystallization quality.

There are primarily three types of $P_2O_5$ losses that may occur in a phosphoric acid process. First are lattice losses or co-crystallization losses which occur due to the precipitation or co-crystallization of $P_2O_5$ with the calcium sulfate. Lattice losses tend to increase as the amount of excess sulfate in the reactor is decreased. Second are coated rock losses which are due to an over-vigorous calcium sulfate (gypsum) crystallization. Such a crystallization causes phosphate rock particles to be covered by a gypsum layer, thus shielding the particles from further attack (reaction) by the sulfuric acid before the particles can completely react. Any phosphate rock particles that become coated with gypsum constitute a loss of $P_2O_5$ production because the unreacted phosphate in the particle is filtered out of the phosphoric acid solution together with the other solid matter (primarily gypsum) in the tank slurry. Coated rock losses increase as the excess sulfate in the attack tank increases. Coated rock losses also may vary to some extent with the quality and with the fineness of the phosphate rock particles (rock quality is usually measured as a grade (a numerical value) in units of bone phosphate of lime (BPL)). Third are acid losses which occur due to inadequate filtration, i.e., leaving phosphoric acid solution in the filtrate. Gypsum crystal size, and thus filtration characteristics, is determined primarily by the variability in the excess sulfate. In a properly operated phosphoric acid plant, lattice losses and coated rock losses usually account for a majority of the acid losses encountered.

The recovery of $P_2O_5$ is strongly dependent on the amount of excess sulfate in the reactor. The optimum operating point (target) for excess sulfate varies from plant to plant, and may vary with feed rate. Therefore, the optimum amount of excess sulfate for a particular operation typically is determined by periodic efficiency tests. To maximize production of $P_2O_5$ in the reactor, the amount of excess sulfate in the reactor should be maintained as close as possible to this predetermined optimum (target) operating point. The determination of the optimum point of operation for a particular facility is well within the skill of the phosphoric acid process control art.

Another important factor that influences the efficiency of a phosphoric acid plant is operation of the filter. The reactor effluent, which comprises phosphoric acid solution and gypsum, is sent to a filtration unit wherein the solid gypsum is separated from the solution. The gypsum forms a filter cake and the filtrate comprises phosphoric acid solution. The filtrate is further treated before shipment.

The filter cake is washed with water to recover phosphorous values. Typically, a two or three-stage counter-current washing is utilized. Process water, which contains essentially no phosphorous values, is used to wash the gypsum cake a final time before the cake is removed as a by-product. In a three-stage system, the wash water, which contains some phosphoric acid, then is used in the penultimate washing, from which additional phosacid is recovered. In a third stage, the gypsum cake just separated from product acid is washed with the solution from the second washing. A portion of the solution from this third washing is introduced to the attack tank. This stream typically is known as an 'acid-recycle stream', as 'return acid', or simply as 'return'.

Reactor and filtration operating parameters should be closely controlled to ensure maximum recovery of phosphoric acid from these units. Maximum recovery of phosphoric acid does not necessarily correlate with maximum concentration of phosacid in the reactor or the maximum concentration of phosacid in the product filtrate stream. Rather, the maximum recovery of product is obtained by maintaining an optimum concentration of phosacid in the reactor.

As set forth in Equation A above, water and sulfuric acid are fed to an attack tank along with phosphate ore. Typically, the ore is fed in the form of an aqueous slurry, and acid solution is recycled from the cake washings. It is typical to add a stoichiometric excess of water.

Water may be added by way of various process streams, including the feed phosphate ore ("rock") stream, the acid recycle stream from the filter, or a raw water feed stream. Water required to provide the stoichiometric quantity of water in accordance with the reaction set forth in Equation A may be added by way of any one of these streams. It is common in the trade to add the water to the attack tank by way of the return acid from the filter unit. However, an operator must take care not to add water to the filter in a quantity that will oversaturate the gypsum filter cake. As skilled practitioners recognize, it is not desirable for the moisture content of the filter cake to be excessively high because water remaining in the cake effects the water balance in the attack tank. It is desirable to maintain an overall water balance on the attack tank and filter to maintain the stoichiometric relationship set forth in Equation A in the attack tank while at the same time maintaining the efficiency of the filter unit and the moisture content of the filter cake.

Typically, in manual operation of a phosacid attack tank and filter, an operator would vary the amount of water added to the filter by visual inspection of the moisture content of the filter cake discharged and the knowledge of concentration of phosacid in the attack tank. For example, low phosacid concentration decreases cake discharge moisture content. As a consequence of the low phosacid concentration, the operator would decrease the amount of water added to the filtration unit. This decreases the rate at which water is added to the filter, and thus, less water will be added to the attack tank by way of the return acid. The lower quantity of return acid causes the phosacid concentration in the attack tank to increase.

As the phosacid concentration in the attack tank increases, the operator would add water to the filter in an attempt to bring the concentration of phosacid in the attack tank to its optimum value. However, this additional water would cause the moisture content of the gypsum filter cake to increase, and still more water would have to be added to the filter to rinse the filter cake. Under these conditions, the ability of the filter to accept more water would be marginal at best, because the gypsum crystals would be affected by the acid concentration. Also, as the concentration of phosacid in the attack tank increases, the viscosity of the reaction effluent increases, and the phosacid tends to adhere more easily to the gypsum crystals. The additional acid content of the slurry leaving the attack tank therefore causes the filterability of the gypsum filter cake to decrease and further reduces the efficiency of the filter. Thus, production rates of phosacid would decrease even though the concentration of phosacid in the attack tank was high.

Thus, keeping the phosacid concentration in the attack tank essentially constant is desirable to maximize phosphoric acid yield. Because the concentration of the phosphate ore fed to the attack tank is constantly changing, maintenance of the concentration of phosacid in the attack tank is difficult. Also, as described above, the sulfate and phosphoric acid concentrations in the attack tank influence the growth and type of calcium sulfate crystals formed in the attack tank. Thus, there is a need to control the operating conditions in the attack tank and filtration unit to ensure maximum yield of phosphoric acid.

Many problems may arise when attempting to maintain the excess sulfate in the reactor at the predetermined optimum point. If, for example, the optimum operating point was found to be zero percent excess sulfate, then the amount of sulfate desired in the reactor is that amount that allows a complete reaction of all phosphate and results in no (zero percent) excess sulfate present. The amount or flow rate of sulfuric acid necessary to achieve this optimum operating point will based on several factors including, inter alia, (1) the mass flow rate of the rock (usually measured in tons/hour), (ii) the quality or grade of the rock (CaO content), (iii) rock fineness, and (iv) reactor temperature. Therefore, the flow rate of sulfuric acid which is fed into the reactor (attack tank) required to achieve the optimum operating point (sulfuric acid demand) will vary with changes in rock mass flow rates, rock qualities, and fineness of incoming rock.

The quality or grade of the rock is determined by the calcium concentration and the type and amount of impurities in the rock. The fineness of the rock is determined by the rock itself and the process and equipment used to grind the rock. The mass flow rate of the rock, which may be considered to be the operating rate or speed of the plant, can be measured using a magnetic flow meter (if rock is fed as slurry) to determine volume flow of rock per unit time, and a nuclear density meter to measure the density of the rock slurry. Using these two values, the mass flow rate of the rock (tons/hour) may be calculated. For each rock type (including fineness, quality, etc.) there exists some demand of sulfuric acid (S) per ton of rock (R), which may be represented as the ratio S/R, which produces the desired level of excess sulfate in the reactor. This may be referred to as the desired S/R ratio.

The excess sulfate level in the reactor may be tested manually using well known laboratory methods, such as by precipitation of sulfate as barium sulfate and by measuring turbidity. The acid flow rate and the rock mass flow rate must be monitored and adjusted to maintain the excess sulfate level in the reactor equal to this predetermined level. For example, in one approach, the rock mass flow rate may be held approximately constant and the flow rate of the sulfuric acid adjusted to maintain the desired S/R ratio.

However, several additional problems exist which often hinder attempts to run the plant at this optimum operating point. First, the quality and fineness of the incoming rock are constantly changing because the quality of the rock and type of impurities in the rock vary widely among different ore sites, and even at the same site. Thus, the desired S/R ratio must frequently be updated in order to maintain the reactor at the optimum level of excess sulfate. Unexpected difficulties such as mechanical problems (i.e., broken pumps, stuck valves, and the like) often prevent maintaining the flow rates at a known constant level, and may cause the excess sulfate level in the reactor to change drastically before any malfunction is detected. Even if the sulfuric acid flow rate is properly adjusted for the particular incoming rock, the excess sulfate already present in the reactor may not be correct. Therefore, an additional adjustment in the sulfuric acid flow rate must be made to correct for any sulfate excess or deficiency already in the reactor. In addition, after an adjustment in the sulfuric acid flow rate has been made, there is an unavoidable lag time before the excess sulfate level in the reactor changes in response to the new acid flow rate.

Skilled practitioners also recognize that factors affect the ability to maintain the phosacid concentration in the attack tank at the optimum concentration. As described above, the concentration of phosphate ore in the rock fed to the attack tank constantly changes. To maintain the concentration of phosacid in the attack tank at its optimum value, the amount of water added to the attack tank must be adjusted to maintain at least the stoichiometry of Equation A above. The water addition rate must also be adjusted to compensate for differences in reaction rate caused by differences in fineness of the rock. Failure to consider fineness and its effect on reaction rate may cause the concentration of phosacid in the attack tank solution to change even though the mass flow rate of feed rock is constant.

Filterability of the reaction slurry (attack tank effluent) also affects product recovery. Because the amount of phosphate fed to the attack tank is not constant, the amount of sulfuric acid needed to effect the reaction set forth in Equation A above also changes. The amounts of product and by-product produced thus are constantly changing, and these changes affect the chemical makeup of the filter cake. Thus, rinse water may be required at the filtration unit to further rinse the filter cake and remove the phosacid entrained therein, but the additional water may not be necessary at the attack tank. Further difficulties arise when unexpected mechanical problems affect the flow rates of attack tank feed and effluent streams, and may cause the phosacid concentration in the attack tank to worsen drastically before these problems are detected.

Although plant efficiency of a phosacid plant is strongly related to the efficiency of the filtration step, control of filter operation, or of the attack tank, does not provide control of overall plant efficiency. For example, U.S. Pat. No. 3,104,946 discloses a method for controlling a wet process plant by monitoring the free sulfuric acid (sulfate) content in the attack tank by adjusting the acid-to-rock feed ratio to compensate for the sulfuric acid (sulfate) content of the recycle stream. In SU 597,632 is disclosed a method for controlling the sulfuric acid dilution process by regulating the flow rates of concentrated sulfuric acid, monohydrate, and water to maintain a constant stoichiometric ratio of diluted sulfuric acid and of the monohydrate. Plant efficiency is not considered in such control schemes.

The aims of other control schemes, such as that disclosed in U.S. Pat. No. 4,777,027, are not plant efficiency, but rather energy efficiency or reduced capital requirements. Indeed, the method disclosed in U.S. Pat. No. 4,777,027, is directed, inter alia, to production of calcium sulfate solids in a particular form (e.g., hemihydrate, dihydrate) desired for subsequent use. While maintaining conditions appropriate for a wet process producing phosphoric acid, operating conditions (in particular, reaction temperatures and flow rates of mixtures circulating around the reactors) are adjusted to produce the desired form of calcium sulfate at a concentration which achieves a desired phosphoric acid concentration.

One method said to provide efficient control over a wet process plant is disclosed in SU 1,411,276 (abstract). In accordance with that method, one obtains a material balance on the liquid streams to and from the filter and calculates the ratio of liquid to solid in the attack tank effluent. The rate at which water is added to the attack tank also is determined. The ratios of the flow rates of raw material to the flow rate of recycle and of liquid material to solid material in the attack tank are computed. The concentration of phosphoric acid in the liquid phase of the attack tank and the level in the attack tank are kept at desired operating points by adjusting the recycle rate. The ratio of liquid phase to solid phase in the attack tank also is controlled by adjusting recycle rate.

Methods of controlling reactions to produce constant production rate of a desired product, such as that disclosed in U.S. Pat. No. 3,130,187, do not maintain plant efficiency. Similarly, control schemes for reactions requiring a plurality of feed stocks, such as the scheme disclosed in U.S. Pat. No. 4,332,590, which control relative reactant concentration ratios and total feedrate to achieve a desired total production by maintaining a desired reactant concentration, do not achieve constant efficiency.

In accordance with the method of U.S. Pat. No. 4,332,590, the flow rates of all materials fed to and removed from the reactor, including any recycle streams, are manipulated to control reactor residence time. Further, the temperatures of streams fed into the reactor are controlled to achieve a desired conversion rate. The aim of this control method is to achieve a constant flow rate of a desired reactant which is introduced into the reactor in a stream in which the concentration of the desired reactant varies, so that the desired total production is achieved.

Similarly, methods for controlling operation of filters, such as that disclosed in U.S. Pat. No. 4,358,827, does not achieve constant efficiency. Rather, the object of such methods is to optimize filtration operation. Even assuming such a method, which is directed to dewatering sludge, were applicable to the phosacid/gypsum separation step, operation in accordance with the method disclosed therein would not result in a constant efficiency operation.

SUMMARY OF THE INVENTION

The present invention is based on the discovery that constant efficiency operation of a wet process phosphoric acid plant can be obtained by controlling the specific gravity of the filtrate from the last washing of the gypsum cake. The filtrate from the last washing of the gypsum cake also is called the first pass filtrate. The specific gravity of this first pass filtrate provides an indication of the overall filter efficiency and the loss of water-soluble phosphoric acid to the gypsum waste stream.

In accordance with the invention, the specific gravity of the first pass filtrate is controlled by adjusting the rate at which product slurry from the attack tank is fed to the filter. This product slurry feed rate is affected by the mechanical performance of the filter and the filterability of the gypsum crystals, which, in turn, is affected by operating conditions in the attack tank. Therefore, the feed rates of phosphate rock, sulfuric acid, and water, are controlled to produce the desired attack tank operating conditions and to maintain attack tank level. Each of the primary processing steps, i.e., operation of the attack tank and operation of the filter, is controlled to maximize plant efficiency. By minimizing phosphoric acid loss and optimizing operation of the attack tank in accordance with the invention, plant efficiency is maximized.

BRIEF DESCRIPTION OF THE DRAWINGS

FIG. 5 illustrates data for a deviation control example of a preferred embodiment of attack tank control of the present invention.

FIG. 7 illustrates data for calculations of ten sampling periods of a preferred embodiment of attack tank control of the present invention.

FIG. 8 illustrates a sequence of steps which may be performed to operate a preferred embodiment of attack tank control of the present invention.

DETAILED DESCRIPTION OF THE INVENTION

Figure 1:
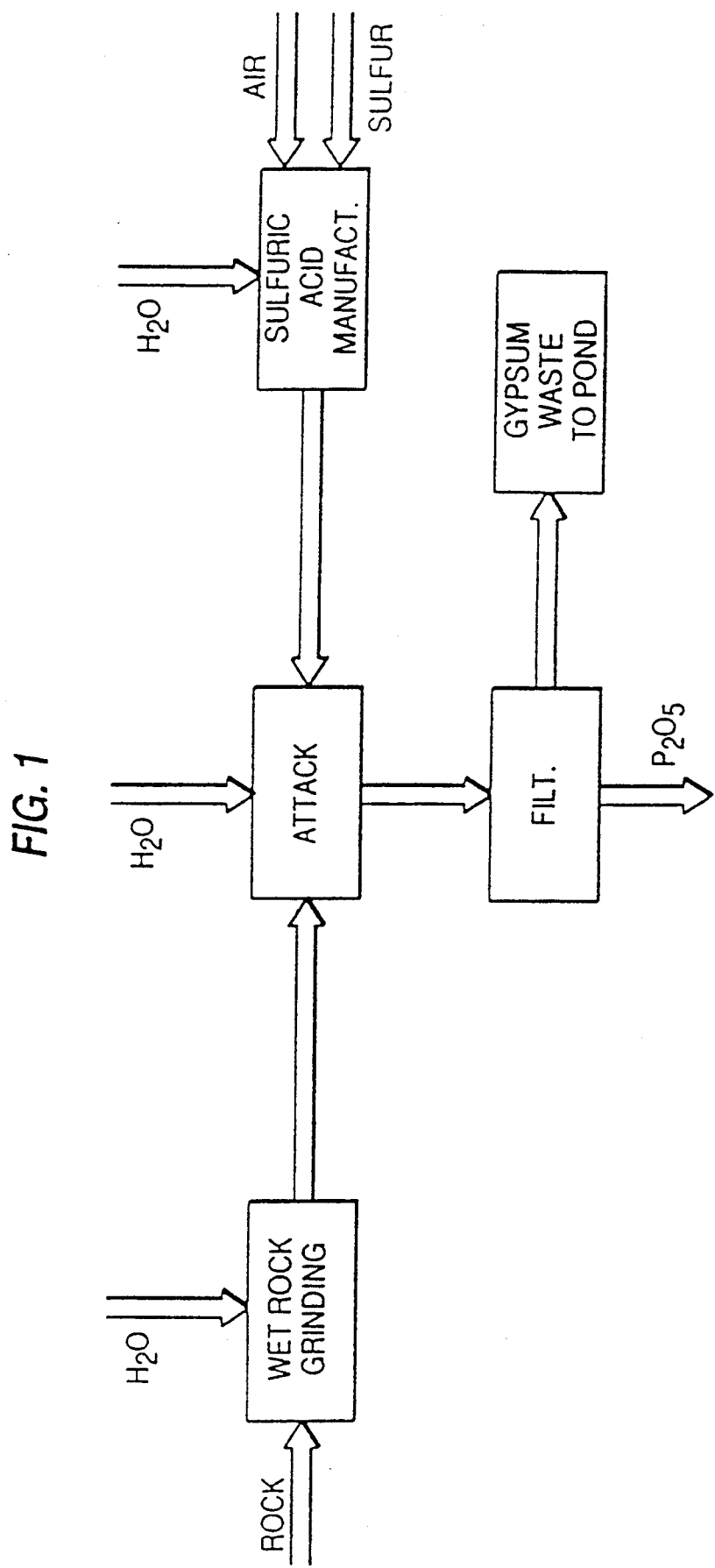
FIG. 1 is a simplified schematic flow diagram of a wet process phosphoric acid plant, including sulfuric acid manufacture.

For convenience, the invention is described in detail herein with regard to control of a filter in a wet process phosphoric acid plant, and with regard to control of an entire wet process plant. However, the invention described herein is applicable to control of any filter to which is introduced a slurry of insoluble product and soluble product in solvent. The difference between the actual specific gravity of the first pass filtrate and a desired specific gravity of the first pass filtrate is used to control operation of the filter by adjusting the rate at which slurry is introduced to the filter or by adjusting the filter operation rate, for example, by adjusting the rotation rate of a rotary filter or the belt speed of a belt filter. The method of the invention is suitable for controlling a filter to obtain desired recovery of liquid product or to obtain desired purity of solid product (filter cake). Control of the operation of the remainder of the plant often is desirable.

As can be appreciated, the method of the invention is particularly useful for separating a viscous liquid product from a solid product. An example of such a separation is the recovery of phosphoric acid solution from gypsum filter cake in a wet process phosphoric acid plant. Phosphoric acid solution tends to be retained in the gypsum filter cake, especially at higher phosphoric acid concentrations, because the viscosity of phosphoric acid solution increases as concentration increases. The method of the invention is used to control the operation of the filter, including of the washing of phosphoric acid solution from the gypsum filter cake, based on the specific gravity of the first pass filtrate.

The present invention is based on the discovery that constant efficiency operation of a wet process phosphoric acid plant can be obtained by controlling the specific gravity of the filtrate from the last washing of the gypsum cake, i.e., the first pass filtrate. The specific gravity of the first pass filtrate provides an indication of the overall filter efficiency and the loss of water-soluble phosphoric acid to the gypsum waste stream.

In accordance with the invention, the specific gravity of the first pass filtrate is controlled by adjusting the rate at which product slurry from the attack tank is fed to the filter. This product slurry feed rate is a function of the mechanical performance of the filter and the filterability of the gypsum crystals, which, in turn, is a function of operating conditions in the attack tank. Therefore, the feed rates of phosphate rock, sulfuric acid, and water, also are controlled to produce the desired attack tank operating conditions and to maintain attack tank level. Each of the primary processing steps, i.e., operation of the attack tank and operation of the filter, is controlled to maximize plant efficiency. By minimizing phosphoric acid lost to the gypsum coproduct stream and optimizing operation of the attack tank, plant efficiency is maximized in accordance with the method of the invention.

Skilled practitioners recognize that over-all plant efficiency is strongly affected by filtration efficiency. Filtration efficiency is a function of the mechanical efficiency of the filter and of the filterability of the gypsum crystals. However, filtration efficiency is not the sole determinant of over-all plant efficiency. Rather, it is preferred to exercise process control over attack tank operation to obtain maximum plant efficiency while satisfying a production goal. Operation of a phosacid plant in accordance with the invention results in highly-efficient, low-cost operation because phosacid loss is minimized and raw material usage is maximized.

In the wet process for phosphoric acid production, phosphate-containing rock and sulfuric acid are reacted in an attack tank, typically in an aqueous medium. As set forth in Equation A, the primary reaction products are phosphoric acid and gypsum. Although phosphoric acid is soluble in the aqueous medium, gypsum is not.

Therefore, the two products can be separately recovered from the product slurry by filtration to produce aqueous phosphoric acid solution and gypsum cake. Skilled practitioners recognize that typically recycle streams also are utilized in the wet process.

Figure 2A:
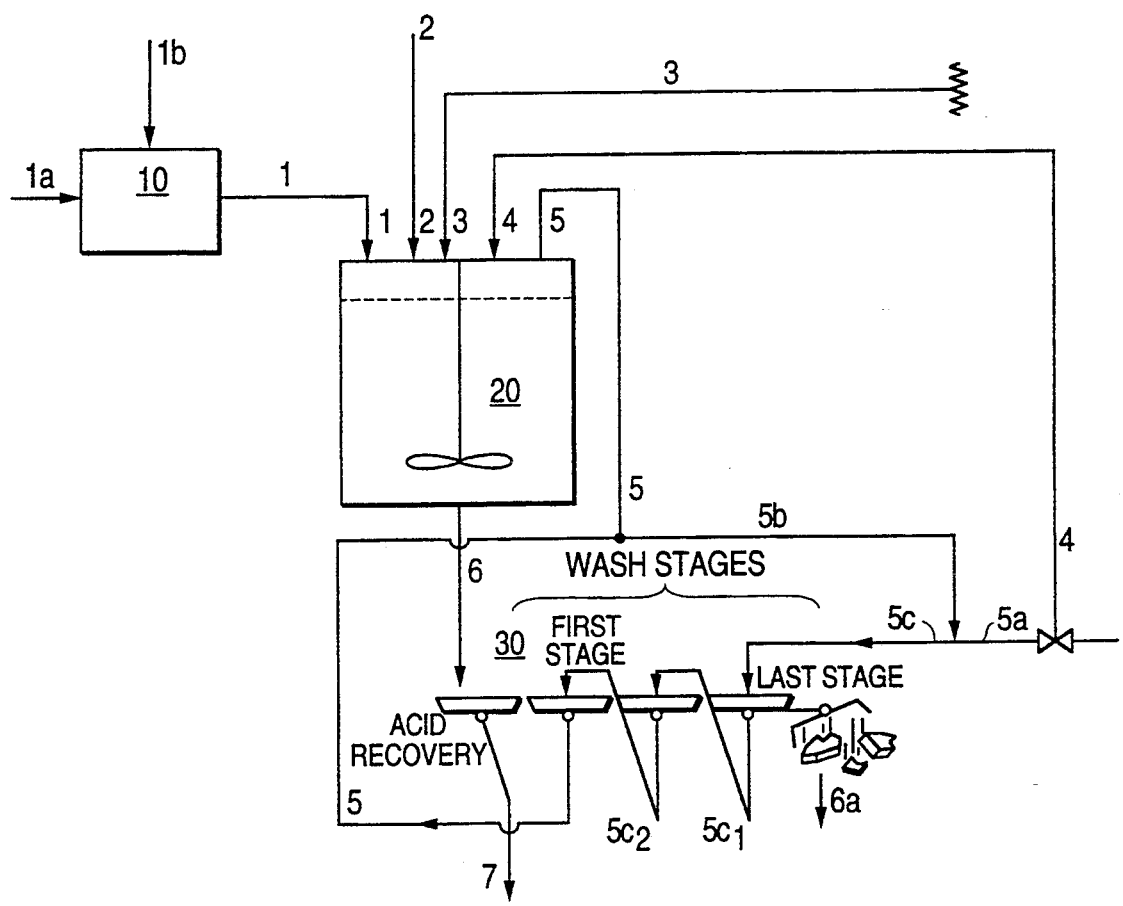
FIG. 2A is a diagrammatic representation of the rock feed unit, the attack tank, and the filter of a wet process phosphoric acid plant controlled in accordance with the present invention.

FIG. 2A depicts schematically the rock feed unit, the attack tank, and the filter of a typical wet process phosacid plant. FIG. 2A depicts five streams by which material is introduced to the attack tank. These five streams are representative of types of streams typically present in a wet process phosphoric acid plant. The number of streams is not important.

Phosphate-containing rock stream 1a is fed to rock crusher or grinder 10 in which the rock typically is crushed or ground to yield particles of desired size. Typically, water, represented by stream 1b, is added to the rock to form a rock slurry. Rock, dry or as a slurry, is fed to attack tank 20, as indicated by stream 1 in FIG. 2A. Thus, stream 1 is phosphate-containing rock, typically slurried with water.

Sulfuric acid, represented by stream 2, also is fed to attack tank 20. Most commonly, sulfuric acid stream 2 is a concentrated aqueous solution of acid. Although any concentration of sulfuric acid can be utilized, the typical sulfuric acid concentration exceeds 80 percent, and more typically exceeds 90 percent, and often is at least about 93 percent.

Stream 3 represents a stream, typically in relatively minor quantity, which may be introduced to the phosacid plant attack tank from another operation in the plant not otherwise described herein. This stream can contain any material which is not deleterious to the production of phosacid. Typically, stream 3 contains dilute acid (sulfuric, phosphoric, or a blend thereof).

Product stream 6 removed from attack tank 20 is an aqueous slurry comprising gypsum in aqueous phosphoric acid solution. The solid gypsum and the liquid fraction are separated in filter 30. Typically, filter 30 is a multi-stage filter in which the solid is washed a plurality of times with washing medium 5c passed countercurrent to the solid. A three-stage filter, that is to say, a filter in which the filter cake resulting from the filtration of product slurry 6 is washed three times, is illustrated in FIG. 2A. Skilled practitioners are familiar with such filtration equipment having various numbers of filtration stages. Each can be used when practicing the method of the invention.

Typically, filtration stages are identified sequentially, starting with a first stage. Liquid product, for example phosphoric acid product, is separated from the solid product (filter cake), for example gypsum, in the first stage. Then, the filter cake is washed or rinsed (the terms 'washed' and 'rinsed' are used interchangeably throughout the specification and claims) in the first and any subsequent washing stages. Filter cake in the first stage has the highest concentration of retained liquid product, whereas filter cake in the last stage has the lowest concentration of this product.

A wash fluid or wash medium typically is used to wash the filter cake in the last stage. Typically, the filtrate from the last stage then is used to rinse the filter cake in the penultimate stage. In this manner of operation, the filter cake is treated in sequential stages from the first stage to the last, whereas the rinse fluid progresses in countercurrent flow from the last stage to the first stage. Skilled practitioners recognize that in such countercurrent flow, the wash fluid having the lowest soluble liquid product concentration is used to wash the filter cake having the lowest concentration of liquid product in the last stage, and the fluid having the highest liquid product concentration is used to wash the filter cake having the highest liquid product concentration in the first stage.

A second naming convention also is known to skilled practitioners. Whereas "stages" is used to refer to the number of washes of the filter cake (first stage is the first wash, last stage is the last wash before the filter cake is further processed), "passes" is used to identify the number of times the wash fluid has been used to wash filter cake. Thus, "first pass filtrate" is the filtrate from the last stage of the filter. First pass filtrate then is used as wash fluid in the penultimate filter stage, and the filtrate from this stage is called second pass filtrate. Filtrate from the first stage thus is called last pass filtrate.

Often, last pass filtrate is returned to the reactor for the purpose of recovering the liquid product therein. In particular, last pass filtrate also is known as "return" or "recycle"; in a wet process phosphoric acid plant, last pass filtrate also is known as "recycle acid" or "return acid." Such recycle acid typically will have a $P_2O_5$ concentration of between about 10 and 25 wt percent, more typically between about 15 and 25 wt percent, and most typically between about 20 and 23 wt percent.

Filtrate from the filtration of product stream 6 is product phosacid stream 7. Phosphoric acid aqueous solution stream 7 can be subjected to further processing, such as evaporative concentration, in accordance with methods known to skilled practitioner. The concentration of phosphoric acid in product stream 7 typically is about 30 percent, but may vary. Solid gypsum is captured on the filter and forms a filter cake. Typically, water and water-soluble phosphoric acid also are present in the filter cake.

The gypsum filter cake then is washed a plurality of times, typically, and as illustrated in FIG. 2A, three times, with a washing medium to recover as aqueous solution phosphoric acid remaining in the filtercake. As described generally above, washing typically is carried out in a plurality of counter-current stages. Washing medium 5c is used to wash the gypsum filter cake in the last stage of the filter before co-product gypsum stream 6a is removed from the filter for processing in accordance with known methods, as illustrated in FIG. 2A.

Filtrate from the last stage, i.e., first pass filtrate, is designated $5c_1$ on FIG. 2A. As described above, first pass filtrate $5c_1$ then is used to wash the filter cake in the prior (penultimate) stage. This next stage filtrate is designated $5c_2$. Counter-current use of filtrate from a stage to wash the immediately prior filter cake stage continues throughout the filter. Thus is phosphoric acid recovered from the filter cake.

Filtrate from the first stage washing, the "recycle acid" stream, is indicated as stream 5 in FIG. 2A. As illustrated in FIG. 2A, recycle stream 5 typically is returned to the attack tank, although it can be diverted to other uses.

A portion, typically a minor portion, of the recycle acid stream can be recycled around the filter rather than fed to the attack tank. Such a recycle stream is illustrated as 5b on FIG. 2A. Thus, wash medium 5c is made up by combining fresh wash fluid stream 5a with filter recycle stream 5b, if any.

Washing medium 5c is in major part fresh water, indicated as stream 5a in FIG. 1. However, stream 5c may contain small quantities of impurities, such as phosphoric acid or sulfuric acid, which are not deleterious to the gypsum filter cake, or to the chemical reactions in the attack tank. The latter suggestion is based on the preference not to introduce deleterious materials to the process.

Water stream 4 is a filter bypass and serves to introduce fresh wash fluid directly to the attack tank. Water stream 4 and fresh wash fluid stream 5a can have the same composition, or can be different. The schematic diagram in FIG. 2A illustrates the typical situation, in which the streams have the same composition. Each stream typically is water in which may be found minor concentrations of materials not deleterious to wet process phosacid plant operations. Typical of such materials are phosphoric acid and sulfuric acid. These aqueous streams 4 and 5a often include recycle or return of minor acid-containing streams, and may be comprised of fresh water, water, and minor amounts of phosphoric acid from streams from units other than attack tank 20 and filter 30, or other water sources, so long as the concentration of water in such streams is known.

The filter cake discharge is removed through line 7a for further treatment, and phosphoric acid product stream 7 is subjected to further processing in accordance with methods known to skilled practitioners. As mentioned above, the concentration of phosphoric acid in product stream 7 typically is about 30 percent. Skilled practitioners recognize that this concentration may vary and that such a variation in product phosphoric acid concentration may be achieved by varying the concentration of phosacid in attack tank 20.

Figure 2B:
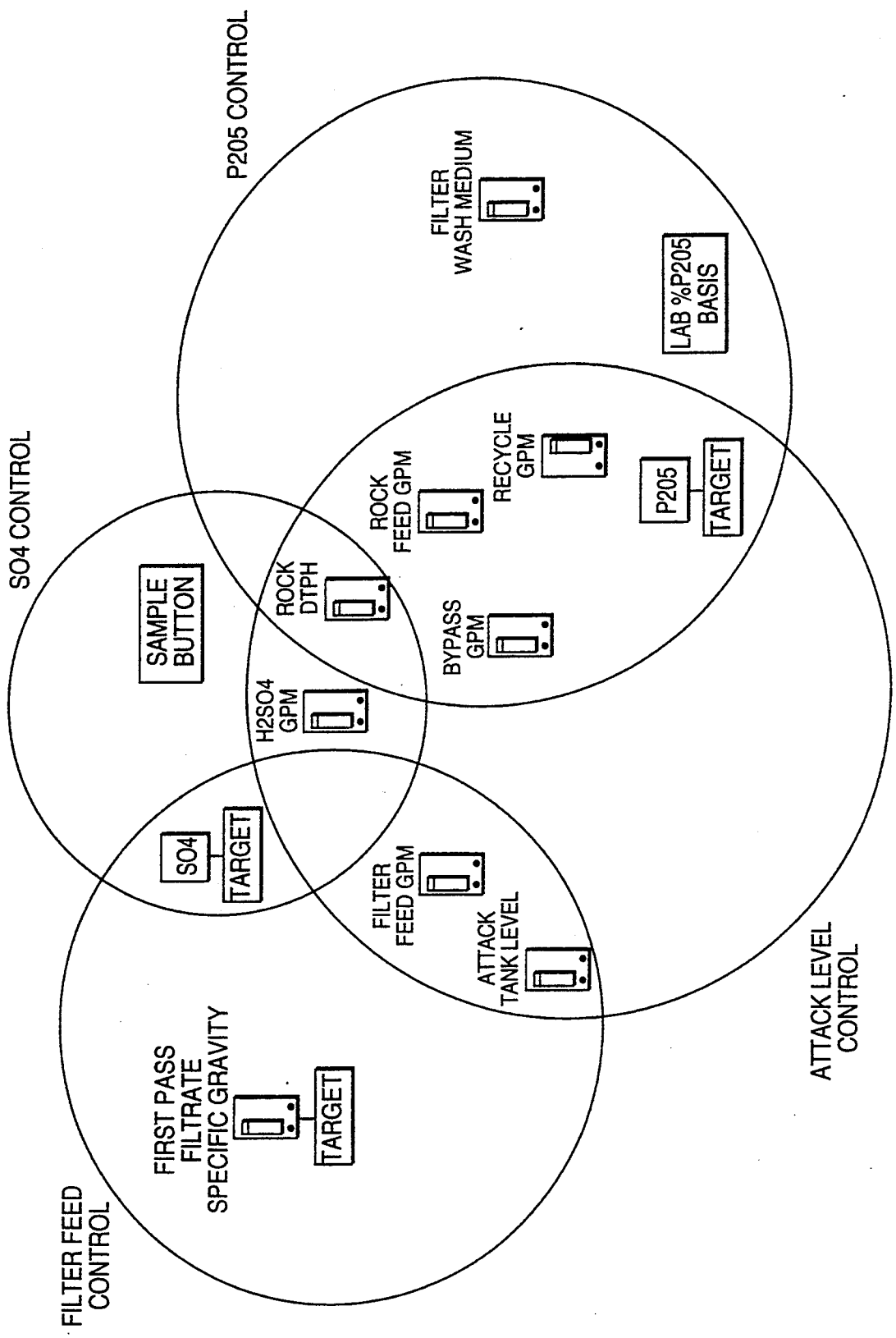
FIG. 2B is a pictorial representation of the interrelationship of control strategies in accordance with a preferred embodiment of the present invention.

FIG. 2B is a pictorial representation of control strategies in accordance with a preferred embodiment of the invention. As illustrated therein, control is exercised over the sulfate concentration in the attack tank, the $P_2O_5$ concentration in the attack tank, the level in the attack tank, and the filter feed rate, or the product slurry rate. Each control strategy utilized input from a plurality of sources and exercises control over a plurality of flow rates. Also, as illustrated, control over a particular flow rate often is exercised by more than one control strategy.

FIG. 2B illustrates the primary control features; additional information sources or controlled flow rates also may be present.

As illustrated in FIG. 2B, the strategy for controlling the sulfate concentration in the attack tank requires information relating to the phosphate rock feed rate, the sulfuric acid feed rate, the sulfate concentration in the attack tank, and the time at which any samples are taken, indicated by "Sample Button" in the Figure. The sulfate concentration control strategy then controls operation of the rock and acid feed rates. The calculated dry rock feed rate is shared with the $P_2O_5$ control. The sulfate concentration control in the attack tank also is shared with the product slurry (filter feed) control.

FIG. 2B further illustrates that control over the filter feed rate and the level in the attack tank is shared between the filter feed control strategy and the attack tank level control strategy. The attack tank level control strategy also shares control of the sulfuric acid and rock feed rates. The $P_2O_5$ concentration control strategy and the attack tank level control strategy share information gathered from and control over rock slurry feedrate, recycle and bypass rates, and $P_2O_5$ concentration. The filter wash medium flow rate is controlled by the $P_2O_5$ control strategy. The $P_2O_5$ concentration in the attack tank, as determined by laboratory analysis, is an input to the $P_2O_5$ control strategy.

FIG. 2B thus illustrates pictorially the interrelationships among control strategies described in detail hereinbelow. Skilled practitioners recognize that other streams typically are found in a phosphoric acid plant and, within the guidelines presented herein, under which control strategy each such stream would be placed.

In accordance with the method of the invention, filter feed rate is adjusted to maintain a desired specific gravity for the first pass filtrate solution. A desired value for the specific gravity of this first pass filtrate solution is based not only on plant production and efficiency goals, but also on the specific gravity of wash fluid. Skilled practitioners recognize that the specific gravity of phosphoric acid solution increases with increasing concentration, and is affected by impurities such as sulfuric acid and fluorine. Thus, target first pass filtrate specific gravity values for different operating plants may vary to accommodate not only local characteristics of each plant, such as the concentration of impurities present in the wash fluid and in the first pass filtrate and the number of stages, but also business judgments such as the acceptable level of phosphoric acid loss to the gypsum cake. For example, if the specific gravity of the wash fluid is relatively high, (i.e., there is phosphoric acid or impurities present), the expected specific gravity of the first pass filtrate would be relatively high. The greater the number of stages, the lower the expected specific gravity of the first pass filtrate, because the concentration of phosphoric acid in the gypsum cake would be lower than if fewer stages were used. Because phosphoric acid will partition into the aqueous fraction during washing and because a greater acceptable phosphoric acid loss means that the expected concentration of phosphoric acid in the filter cake will be relatively high, the specific gravity difference will tend to be greater.

Therefore, it is helpful to consider a difference in specific gravity between the first pass filtrate and the washing medium, as the actual value of specific gravity will vary significantly from plant to plant. Typically, the difference in specific gravity between the first pass filtrate and the wash medium will be at least about 0.02, more typically, between about 0.03 and 0.15. With the guidance provided herein, skilled practitioners can determine a specific gravity increase from wash fluid to first pass filtrate, and thus a suitable target specific gravity for first pass filtrate.

Skilled practitioners recognize that the thickness of the gypsum cake placed on the filter and the filterability of the gypsum crystals influences the rate at which wash medium, typically water, passes through the cake and the amount of water soluble $P_2O_5$ removed by this wash water. Filter feed rates, filter rotation speed (for a rotating filter) or belt speed (for a belt filter), and the filter area determine the amount and thickness of gypsum cake that is to be washed. One typical mode of operation of the filter is to maximize rotation or belt speed and vary the filter feed rate to control cake thickness. For convenience, the method of the invention is described herein for such a mode of filter operation in which filter loading, i.e., filter feed rate, is controlled to accommodate the varying filterability of the product slurry and any filter-related mechanical characteristics that effect filter performance. However, the method of the invention is applicable to any filter system and to other modes of operation. For example, the method is applicable to a plant having a belt filter, and to a mode of operation in which filter operation speed also is varied. Skilled practitioners can determine the adjustments necessary to accommodate such different mode of operation within the method disclosed herein.

Figure 3:
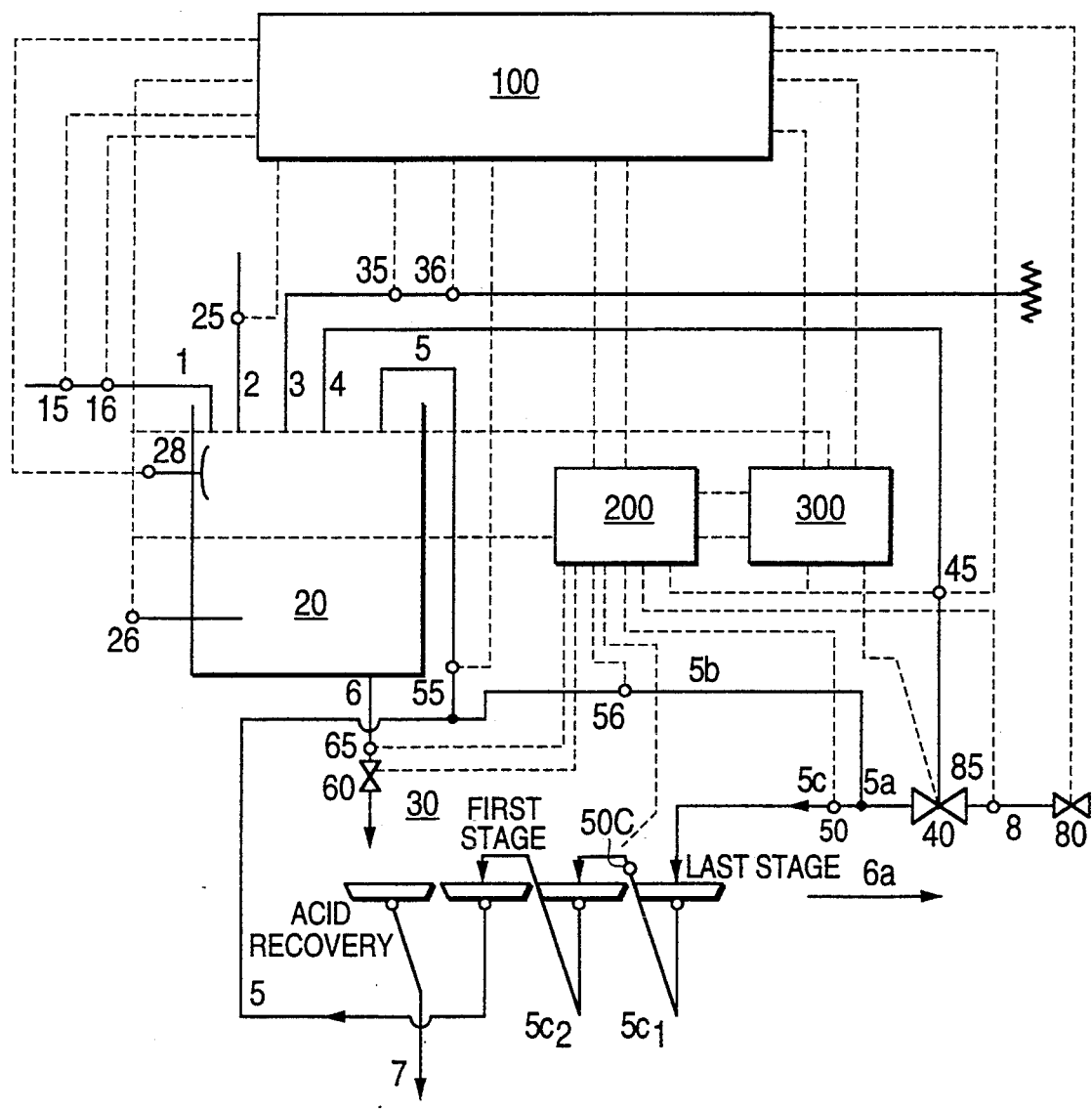
FIG. 3 is a schematic diagram of an automatic control system for controlling a wet process phosphoric acid plant in accordance with a preferred embodiment of this invention.

FIG. 3 represents schematically the control system used in accordance with the method of the invention. Central processing unit 100 represents an on-line computer which controls the overall system. Filter 30 is controlled by the filter control unit 200, and by-pass line 4 is controlled by by-pass control unit 300. Throughout the specification and claims, the phrases "filter control unit" and "by-pass control unit" encompass any method for controlling filter 30 and by-pass line 4, respectively. Various control mechanisms, such as subprograms, separate terminals interfaced with computer 100, or separate on-line computers, can be used. However, both filter control unit 200 and by-pass control unit 300 are interfaced with computer 100.

Continuous measurements are carried out on all process streams. The flow rates of the feed streams 1-5 to attack tank 20 are measured by flow measuring devices, or flowmeters 15, 25, 35, 45, or 55, respectively, and the flow rates are fed into computer 100. The specific gravity of rock feed stream 1 is measured by densitometer 16, and fed to computer 100. The specific gravity and flow rate values are used in a manner known to skilled practitioners to determine the mass flow rate of feed phosphate in stream 1 and feed water through the stream 3. The concentration of phosphoric acid in attack tank 20 is manually determined by random sampling at sampling spigot 26. These values all are input to computer 100.

Attack tank 20 may be comprised of multiple reactor compartments integrally connected and having weirs on both the bottom and the top of each compartment. For example, reactants may flow from the bottom of one tank to the top of the subsequent tank to provide for agitation of the reaction solution. The multiple reactor compartments also may be designed in a maze-type configuration consisting of baffles where the reactants flow throughout the maze. Agitators also may be present to further mix the reactants, and evaporative cooling apparatus may be present to cool the reaction mixture. Skilled practitioners recognize that other types of reactor configurations may be utilized, and that the water additions from the various stream types described above may be implemented at various stages throughout the multiple stage reactor.

Filter 30 is controlled by filter control unit 200. The flow rates of rinse water and recycle acid streams is continuously monitored by flowmeters 50 and 55, respectively. The quantity of water added to filter 30 then can be adjusted by control unit 200 depending on the quantity of water which passes through filter 30.

The flow rate of product slurry 6 is measured by flow meter 65, which transmits input to filter control unit 200. The flow rate of product slurry is controlled by filter control unit 200 through product slurry control valve 60. The specific gravity of first pass filtrate $5c_1$ is measured by densitometer 50c and is input to filter control unit 200. The flow rate of product slurry 6 is represented herein by the variable SETPT, and the average specific gravity of first pass filtrate $5c_1$ is represented herein by SGAVG.

The quantity of water retained by the filter cake (i.e., the moisture content) is influenced by the crystallization characteristics of the gypsum, the concentration of phosacid in the reaction slurry effluent, the vacuum of the filter, cake thickness, and filter speed. The moisture content may be 20-25 percent for easily-filterable crystals, and can range up to 50 percent for difficult filtrations. Easily-filterable crystals are present when the concentration of phosacid in attack tank 20 is low, and crystals are difficult to filter when the phosacid concentration is high. A typical phosphoric acid recovery system would result in a filter cake moisture content having a range of about 25 percent to about 33 percent.

The specific gravity SGAVG of the first pass filtrate and the product slurry 6 feedrate SETPT are averaged over a predetermined period T1. The length LT1 of period T1 is selected to be sufficient to provide useful average values for the measured characteristics and to provide the desired control over the system. Although any period can be selected, a 10-minute period has been found to yield acceptable control over the system.

In accordance with the method of the invention, a desired first pass filtrate specific gravity, identified as TARGET, and a theoretical maximum filter feed rate (TOPFF) are entered into filter control unit 200. TARGET is established in accordance with a desired operating point, and TOPFF is determined by equipment size and operating experience. In a typical wet process phosphoric acid plant, TOPFF will exceed the maximum expected value of SETPT by about 5 percent. However, the exact value of any difference between TOPFF and SETPT will depend upon the operating characteristics of each plant.

In accordance with the method of the invention, SETPT and TARGET are monitored during the predetermined measuring period. Then, an adjustment to the filter feedrate, FFADJ, is determined by filter control unit 200 in accordance with either Equation 1A or Equation 1B as follows:

If SGAVG < TARGET, $$FFADJ = (TOPFF - SETPT)*(TARGET - SGAVG)/TUNEUP \quad (1A)$$

If SGAVG > TARGET, $$FFADJ = SETPT*(TARGET - SGAVG)/TUNEDOWN \quad (1B)$$

The quantities TUNEUP and TUNEDOWN are tuning adjustment parameters dependent on the characteristics of the wet process plant. Typically, both are related to the rate at which product slurry 6 is fed to the filter. The values of TUNEUP and TUNEDOWN may be the same or different, but are determined so that smooth plant operation is achieved within the degree of control desired. By degree of control is meant the amount of variation allowed in a controlled characteristic before corrective action is taken. The degree of control is a matter of preference and the characteristics of the plant under control. Skilled practitioners recognize that degree of control can be adjusted in various ways, including for example by adjusting tuning constants. Thus, skilled practitioners will be able to establish values for these tuning constants.

The inventor has found it convenient to use values for TUNEUP and TUNEDOWN approximately numerically equal to between about 15 and 25 percent of SETPT, i.e., between about 15 and 25 percent of the rate at which product slurry 6 is introduced to the filter. Thus, the values of TUNEUP and TUNEDOWN typically would be between about 300 and 750 for a plant having a product slurry rate of between about 2000 and 3000 gallons per minute.

The filter feed rate adjustment calculated by filter control unit 200 FFADJ then is added to the previous filter feed set point SETPT, as set forth in Equation 2:

$$SETPT(New) = SETPT + FFADJ \qquad (2)$$

where SETPT(New) becomes the new value for the rate at which product slurry 6 is fed to the filter.

Preferably, and as described in Equations 1A, 1B, and 2, establishment of the product slurry feed rate set point provides for large increases and small decreases at low feed rams, and, conversely, small increases and large decreases at high feed rates. In this manner, the product slurry feed ram will be adjusted rapidly toward typical or normal operating rates, and will move only slowly if an additional deviation from normal operating rate is called for by the method of the invention.

Because the product slurry feed rate typically will be high, i.e., about 75 to 90 percent of the maximum rate, increases in feed rate will be relatively small and decreases will be relatively large. The method thus prevents and quickly corrects conditions which may lead to overloading of the filter. Overloading of the filter increases the risk of causing an upset in attack tank operation, particularly by high $P_2O_5$ concentration, and disturbs the recycle acid concentration. Therefore, overloading leads to significant loss of phosphorous values to the filter cake and insufficient acid recycle. Because filter overload reduces operating efficiency, increases loss of phosphorous values, and is difficult to correct, it is preferable to approach optimum filter loading from the underloaded condition, rather than by correcting a filter overload. As skilled practitioners recognize, an underloaded filter operates more efficiently than an overloaded filter.

Whereas Equations 1A, 1B, and 2 provide a significant portion of the adjustments to SETPT, it is desirable to fine-tune these adjustments so as to improve control over the product slurry feed rate over a period T2 shorter than period T1. These adjustments accommodate variations in the operation of the plant during period T2. LT2 should be long enough to avoid transient effects and to afford the opportunity to reflect lag or 'dead' time in the responses of controlled streams due to the mechanical nature of the controlling instruments and the size of the plant. For example, lag time is a function of flow rate through the plant and the volume of reactors, tanks, and other vessels. Skilled practitioners are familiar with the concept of lag time, and are able to determine the lag time for a control system in a particular plant. Typically, the length LT2 of period T2 is about one-half of LT1. However, the length of LT2 can be adjusted to accommodate the operating characteristics of a particular plant.

In accordance with the method of the invention, Equation 3 below is used to make these modest adjustments to the new filter feed rate set point. As set forth in Equation 3, an average value of the difference FP between TARGET and SG, the instantaneous specific gravity of first pass filtrate $5c_1$, is calculated over the period T2. Over period T2 of length LT2, at an interval DT shorter than LT2, FP(DT) is determined in filter control unit 200 as follows:

$$FP(DT) = FP*(LT2 - DT)/LT2 + (SG - TARGET)*DT/LT2 \qquad (3)$$

In accordance with the method of the invention, the SETPT and FP(DT) values then are combined as set forth in Equation 4 to generate the actual filter feed set point SETPT(Actual) sent to the product slurry feed rate control valve 60 at intervals of length DT, as follows:

$$SETPT(Actual) = SETPT(New) + FP(DT)*FFPON \qquad (4)$$

FFPON is a tuning constant used to vary the weighting given the rolling average calculated over shorter period T2. Typically, values between 0 (no effect given shorter interval) and 1 are used; values greater than 1 may lead to overcorrection and unsatisfactory control over the operation of the filter. Skilled practitioners, recognizing that the exact value of FFPON is determined based not only on the operating characteristics of each wet process plant but also on a judgment regarding the degree or quality of control achieved, can use the guidance provided herein to determine a suitable value of FFPON.

Under certain circumstances, it is desirable to reduce the feed rate of product slurry to the filter without regard to the specific gravity of the first pass filtrate. Two such circumstances include (1) when the level in the attack tank is below a designated low level limit and (2) when the sulfate concentration in the attack tank is high. Under such circumstances, skilled practitioners recognize that the rate at which product slurry is removed from the attack tank should be limited.

Because attack tank feed flows are affected by other mechanical equipment, such as the rock crusher, there exists the possibility of a disruption in feed flow to the attack tank or limitation to a value below that necessary to maintain attack tank level. For example, continuing to withdraw product slurry if attack tank flow is severely limited may result in removal of greater volume than is added, thus emptying the attack tank. Reducing or eliminating removal of product slurry from the attack tank when the attack tank is below the predetermined low level limit reduces the likelihood that the attack tank will be emptied.

Product slurry feed rates are reduced during high sulfate condition in the attack tank to prevent severe plant upsets. Skilled practitioners recognize that high sulfate concentration in the attack tank can lead to conditions under which particles of the phosphate-beating rock become coated with gypsum, thus reducing digestion and increasing phosphate loss. If rock coating occurs in the attack tank, the product slurry being fed to the filter will exhibit excellent filtration characteristics. Thus, the product slurry feed rate and attack tank feed rates would be quickly increased to the maximum rates without recognition that the attack tank was operating in a "rock coating" mode. These maximum rates of feed to the attack tank and to the filter during a sulfate upset lower the overall plant efficiency and make it difficult to control the upset. Plant efficiency is reduced because poor digestion increases phosphorous value loss.

In accordance with the method of the invention, the rate at which product slurry is fed to the filter is determined by the filterability of the product slurry, as indicated by the specific gravity of the first pass filtrate. However, the product slurry feed rate to the filter is reduced to ameliorate undesirable operating conditions in the attack tank, even if the specific gravity relationships call for an increase in that rate. However, under conventional operation in accordance with the method of the invention, the feed rates of phosphate-bearing rock, sulfuric acid, recycle acid, and water from various sources are controlled to maintain attack tank level and suitable operating conditions in the attack tank.

Although filtration efficiency has a significant effect on plant efficiency, the operating regime in the attack tank is not without influence on efficiency. Skilled practitioners recognize that various factors lead to product loss. Such factors include, for example, incomplete digestion of the phosphate-containing rock, whether because the rock becomes coated with sulfate or because the quantity of sulfuric acid introduced into the attack tank is insufficient to react with the rock to liberate the phosphorous values. Thus, it is necessary to control the operating regime of the attack tank. Such control includes control over level in the attack tank.

Any method of controlling the operation of the attack tank may be used within the method of the invention. The inventor prefers to control operation of the attack tank in accordance with the following method.

Figure 4:
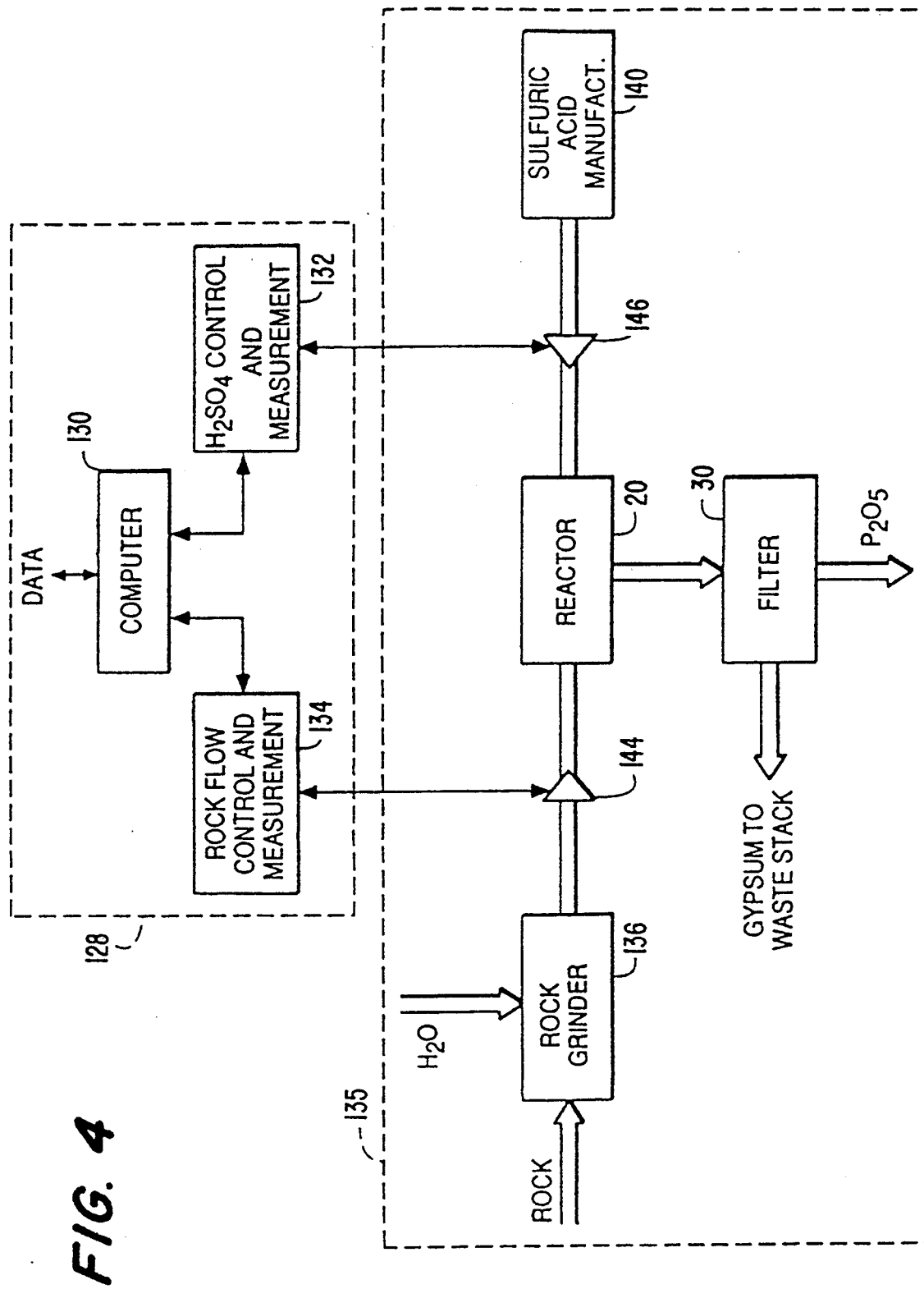
FIG. 4 is a schematic diagram of an automatic control system for controlling the attack tank in accordance with a preferred embodiment of the present invention.

Referring to the drawings in detail, wherein like numerals indicate like elements, FIG. 4 is a schematic diagram of an automatic control system 128 for controlling a phosphoric acid plant 135. Phosphoric acid plant 135 includes rock grinder 136, rock pump 144, reactor (or attack tank) 138, acid pump 146, sulfuric acid plant 140 and filter 30, but may include additional or alternative components found in phosphoric acid plants. Phosphoric acid plant 135 is preferably of the "wet process" type. The rock may be fed to plant either as a slurry or as a dry rock. It should be understood that the dashed lines in FIG. 4 separating automatic control system 128 from plant 135 have been drawn for explanation purposes, however, automatic control system 128 may include components (for example, acid pump 146) which have been shown in FIG. 4 within plant 135, or components normally found in a phosphoric acid or other plant.

Rock grinder 136 grinds phosphate rock (which may include a number of impurities) and may mix water therewith to form a rock slurry and is coupled to rock pump 144 for feeding the slurry of ground rock into reactor 20. Sulfuric acid manufacturer 140 manufactures sulfuric acid ($H_2SO_4$) and is coupled to acid pump 146 which pumps sulfuric acid from sulfuric acid manufacturer 140 to reactor 20. The rock slurry containing ground phosphate rock is reacted (digested) with the sulfuric acid in reactor 20, which may also be referred to as an attack tank. The rock is dissolved by the acid in the attack tank. The dissolved calcium fraction of the rock is precipitated by the sulfate ions as calcium sulfate. As illustrated by Equation 1 above this reaction produces phosphoric acid ($H_3PO_4$), and calcium sulfate ($CaSO_4$) which is a waste product and is commonly referred to as gypsum. Phosphorous pentoxide ($P_2O_5$) is the term most often used to measure plant production rather than $H_3PO_4$, but these terms may be used interchangeably when referring to plant output. Filter 30 is preferably of the tilting pan filter type and is coupled to reactor 20 and filters the output of reactor 20 in order to separate the $P_2O_5$ from the gypsum.

Automatic control system 128 may include computer 130, acid control and measurement device 132 and rock flow control and measurement device 134. Rock flow control and measurement device 134 is coupled to rock pump 144 and both measures and controls the speed of rock pump 144, and thus both measures and controls the rock mass flow rate from rock grinder 136 to reactor 20. Device 134 may include, for example, a magnetic flow meter 15 for measuring the rock flow rate and a nuclear density meter 16 for measuring the density of the rock slurry, or other devices that may together or separately measure and/or control the rock mass flow rate. From the flow rate and density measurements, the rock mass flow rate may be determined. Rock mass flow rate is often measured in tons of rock per hour. Device 134 preferably continuously measures and controls the rock mass flow rate, but alternatively may perform these functions only periodically. Device 134 (or another device not shown) may also perform an analysis of the rock or slurry quality to determine calcium, $P_2O_5$, phosphate or other content of the rock.

Acid control and measurement device 132 is coupled to acid pump 146 and both measures and controls the speed of acid pump 146, and thus both measures and controls the feed rate 25 of sulfuric acid from sulfuric acid manufacturer 140 to reactor 20. These measurement and control functions are preferably performed continuously, but alternatively may be performed only periodically. In addition to what is shown in FIG. 4, device 132 (or another device not shown) may perform a continuous measurement of the concentration of sulfate in reactor 20. Devices 132 and 134 may be partially or completely built into pumps 146 and 144, for example as a built in "smart" controller which may be used for pre-processing.

Computer 130 is coupled to devices 132 and 134 to receive data therefrom and preferably is programmable and preferably includes a central processing unit, memory, combinational and latching circuitry, and input/output devices for communication with devices 132 and 134, a computer operator, or other device. The input/output devices, for example, may include a keyboard, cathode ray tube screen, printer or any other device which may be connected to a computer. Computer 130 may also include serial or parallel interfaces or specialized interfaces which allow the interconnection of input/output devices and devices 132 and 134 to computer 130. Computer 130 may also include analog to digital converters and digital to analog converters for the conversion of flow measurement, control and other data or signals between analog to digital formats. Alternatively, devices 132 and/or 134 may include analog to digital and/or digital to analog converters for this data conversion. Computer 130 is preferably a personal micro-computer, but may instead be a micro-processor, microcontroller, mini-computer, main frame computer, series of computers or other suitable device which is preferably programmable. The structures and operation of such computers are well-known in the art of process control design.

Computer 130 operates to monitor and control devices 132 and 134, and thus controls and measures the acid feed rate, rock mass flow rate and other factors in order to maximize the efficiency of the phosphoric acid plant. For reasons as discussed above, maximum efficiency (maximum output of $P_2O_5$) of a phosphoric acid plant occurs when the amount of free or excess sulfate (reported as wt. % excess sulfate) in reactor 20 is maintained as close as possible to the plants' predetermined optimum value. This predetermined optimum may vary for different plants and plant speeds and can be determined using procedures well known to those skilled in the art of phosphoric acid production from efficiency tests. This predetermined optimum level of excess sulfate in reactor 20 shall hereinafter be referred to as the "target," because it represents the level of excess sulfate that produces a maximum plant output of $P_2O_5$ from a given amount of phosphate rock. Therefore, computer 130 preferably operates so as to maintain the level of excess sulfate in reactor 20 as close as possible to the target.

Computer 130 of the automatic control system of the present invention performs both sulfate control and deviation control. Sulfate control generally is the calculation and institution of rock and acid feed rates that cause the level of excess sulfate in the attack tank to be equal to the predetermined (optimum) value of excess sulfate. Preferably, sulfate control includes the calculation and institution of a new overall acid feed rate (acid pulse plus a decay to a new acid set point). A sulfate sample is taken from the attack tank and entered into computer 130 at the end of every sampling (time) period. Computer 130 then calculates and institutes the new overall acid feed rate. A sampling (time) period is preferably one hour, and a new sampling period begins when the sulfate sample data is entered into computer 130.

When performing sulfate control, computer 130 calculates an overall acid feed rate for the next sampling period. The overall acid feed rate is the sum of an acid set point and an acid pulse. The acid pulse is calculated to correct for the material already in the tank to bring the excess sulfate level to the target. The acid pulse is then allowed to decay exponentially to the acid set point. The acid set point is the acid feed rate that produces an excess sulfate level, accounting for the incoming material (acid and rock), equal to the target. Thus, the acid set point is matched to the quality, grind, etc. and flow rate of the incoming rock which results in an excess sulfate level equal to the target. By adjusting for the phosphate contribution from incoming rock and for the material already in the tank, the present invention maintains the overall plant excess sulfate level as close as possible to the target to give maximum phosphoric acid production at minimum cost.

At the end of every sampling period, an overall acid feed rate (acid set point and acid pulse) is calculated and then instituted. The overall acid feed rate is calculated using data from several sources: First, computer 130 stores data from calculations of past sampling periods (for example, the actual ratio of the last sampling period). Second, computer 130 receives data from (for example) devices 132 and 134 indicating acid and rock flow (feed) rates which allows computer 130 to calculate the total amount of rock and acid added to the reactor over the last sampling period through integration. Third, computer 130 receives data (which may be imputed manually by the plant operator, for example) on the measured $SO_4$ concentration of attack tank. Using this data, computer 130 calculates the appropriate acid set point and acid pulse at the end of every sampling period. A new sampling period beings when a new sulfate analysis is entered into the computer. Computer 130 changes the acid (and/or rock) feed rate by periodically sending signals to devices 132 and 134 to change the flow rates. Preferably, the rock feed rate is held approximately constant and the acid feed rate is adjusted to apply an acid pulse and decay to a new acid set point to maintain a desired excess sulfate level in the attack tank. However, alternatively, the acid feed rate could be held constant and then the rock feed rate could be adjusted accordingly. This alternate adjustment technique would require a rock pulse and decay to the new rock set point. Because it is more convenient to control acid flow, the former procedure is preferred.

When performing deviation control, computer 130 enforces the acid and rock set points. For example, if the (desired) acid set point was 400 gallons per minute (gpm), but the actual acid rate was 410 gpm, the actual rate would be decreased temporarily to 390 gpm by computer 130 until the actual number of gallons of acid (based on acid set point) was equal to the desired number of gallons. At that point, the actual acid feed rate would be adjusted by computer 130 back to the set point of 400 gpm. The allowed deviation, between the integrated actual feed rate and integrated acid set point before the feed rate is adjusted decreases from an initial maximum value at the start of each new sampling period. This gives the pumps and controllers time to adjust to the new calculated set point.

The sulfate control performed by computer 130 of a preferred embodiment of the present invention uses adaptive ratio techniques to control the sulfate content of the phosphoric acid plant attack tank. Set points (preferred acid and rock flow rates) are computed using on-line data with feedback provided, for example, by hourly manual operator lab analysis. This method automatically adapts to various plant rates, rock feed types, and target sulfate concentrations. The four key components of the present invention are: the ratio calculations, the gain factor for adjustment sizing, the K pulse adjustment technique, and deviation control. The ratio calculations, gain factor and K pulse adjustment are parts of the sulfate control.

Ratio Calculations

Three ratios used in the practice of the method are the actual ratio, the historic ratio, and the set ratio and are used to correct the flow rates based on the rock grade to achieve the target excess sulfate resulting from the reaction of acid and rock entering the attack tank, and in general do not correct the sulfate level for material already in the tank. The actual ratio is calculated by computer 130 from the totalized (integrated) values of the sulfuric acid and rock feeds during the last sampling (time) period and is adjusted for changes in the attack tank sulfate concentration. A suitable sampling period is one hour. This period can be longer or shorter depending upon the preference of the operator. To totalize (integrate) the acid and rock flow rates over the sampling period, computer 130 periodically polls the acid and rock feed rates and multiplies each feed rate times its respective polling period, and then adds them together to get the total amount added during the sampling period. Using this discrete integration process, the total amount of acid or rock added to the reactor can be accurately determined. Computer 130 preferably polls the rock and acid feed rates every 0.5 seconds, but may poll more or less frequently.

The historic ratio is a long term exponentially weighted average of the individual actual ratios with adjustment rules that shield the ratio from suspect data during startups and plant upsets. The set point ratio is used in calculating sulfuric set points and is determined by combining the actual and historic ratios in varying percentages according to current plant conditions. All three ratios are calculated by computer 130 every time additional sulfate concentration data is entered into the computer and reflect the rock grade being fed to the attack tank.

Gain Factor

The gain factor controls the size of the sulfuric acid pulse adjustments required to attain the target sulfate concentration for material already in the attack tank. The gain factor appears in most of the calculations concerning attack tank inventory and it indirectly affects the ratio calculations. A form of statistical process control is used to determine if past adjustments were properly sized for current plant conditions. The gain factor is initially set to 1.

K Pulse Adjustments

K pulse adjustments involve an acid pulse (positive or negative) and an exponential decay to a set point. The K pulse adjustment technique was developed to handle two areas of concern in the control of sulfate concentration. A technique was needed to force the attack tank sulfate concentration to target as quickly as possible and handle variable sampling periods and delay times with a minimal amount of error and overshoot. In preferred embodiment, the K pulse technique causes computer 130 to add 30% of the required adjustment in the first 10 minutes after sample data entry and 50% in the first 18 minutes. The adjustment (acid pulse) continues to taper off until it reaches a value of zero after approximately 120 minutes. The fact that the total adjustment is 90% complete after 60 minutes minimizes calculation error and avoids the need for strict sampling intervals. The time sensitive portion of the calculation is an exponential decay curve with a time constant preferably of 24 minutes. The adjustment sizing portion of the calculation remains constant until new manual data is entered into computer 130. Obviously, different values for the time constant may be used, and will change the response characteristics in ways that will be apparent to those skilled in the art of process control.

Deviation Control

This portion of the automatic control system enforces the set points calculated by the sulfate control portion by correcting the actual (measured) flow rates to be approximately equal to the acid and rock set points (desired acid and rock flow rates). Originally designed to correct for pump failures and other large fluctuations in feed rates, the routine was improved to maintain the acid and rock set point to actual flow ratio within about 0.1% on an hourly basis. In the current mode of operation the routine is activated on most sampling intervals.

To determine the deviation in gallons of acid, computer 130 frequently samples and continuously integrates the acid and rock set points and actual flow rates and the set point ratio is compared to the actual flow ratio using the following equation:

$$Dev. = [(Acid\ Set/Rock\ Set) - (Acid\ Act/Rock\ Act)] * Rock\ Act \quad (5)$$

wherein
Dev. = deviation in gallons of acid
Acid Set = totalized desired acid set point
Rock Set = totalized desired rock set point
Acid Act = totalized acid flow rate
Rock Act = totalized rock flow rate It is important to note that the set point totalizers integrate the desired set points and not the actual set points being sent to the controllers. When deviation control is active, the routine will send corrective set points to the controllers while continuing to totalize the desired values.

The deviation limit is set to a maximum value at the beginning of a time (sampling) period to allow the controllers to adjust to the new set points. The deviation limit is then decreased over time to force the integrated actual (actual feed rates) set points to be within some maximum allowed deviation of the integrated calculated set points. The deviation limit is preferably set at a value of 370 gallons of acid when new manual data is entered and preferably decreases at a rate of 10 gallons per minute until it reaches 30 gallons. The limit is increased after the sample entry to allow the loop controllers to adjust to new set points. The gradual decrease in the limit allows the routine to detect and correct both large or small deviations before the next attack tank sample. Different numbers may be used for the deviation control, however, the preferred numbers were very successful.

When the deviation from the desired set point ratio exceeds the current deviation limit, a timer is activated by computer 130 and the appropriate rock or acid set point is gradually decreased to force the deviation to less than one-third the limit. Set points are always decreased to maintain the desired acid to rock mixture (set ratio) because an increase in flow may not be possible in certain conditions.

The two factors that determine the amount of adjustment to the set point when deviation control is active are the amount of time in minutes after the deviation has exceeded the limit and the size of the deviation. The product of these two factors determines the magnitude of the adjustment that will be applied to the appropriate set point. The actual equations for the acid and rock set points are as follows (for control deviation):

$$Acid\ Set\ Point = Desired\ Acid\ Set - (Dev.\ Gal * Dev.\ Time/50) \quad (6)$$

$$Rock\ Set\ Point = Desired\ Rock\ Set + (Dev.\ Gal * Dev.\ Time/50)/Set\ Ratio \quad (7)$$

The formula for the acid set point is used if the deviation indicates excess acid and the formula for the rock set point is used if a need for acid is indicated. Both formulas reduce the transmitted set point of either the rock or acid. The deviation gallons will be a negative value if the rock set point equation is active. Because the deviation is calculated in gallons of sulfuric acid, the current value for the acid to rock set point ratio is needed to convert the rock adjustment into the appropriate units. The value of 50 in the equations is a tuning constant controlling the rate of response. The deviation time is the amount of time in minutes from when the deviation exceeded the limit unit it is less than one-third the current limit.

Computer 130 gradually reduces the appropriate set point until the product of the deviation gallons and the deviation time begins to decrease. As the product of the two factors decreases, the affected set point increases until it reaches the desired set point or the deviation gallons fall below one-third the current deviation limit. To prevent mechanical damage to plant equipment, deviation control cannot force flow rates below some minimum value, for example, 50 for the rock and 100 for the acid. The deviation control routine operates on computer 130 concurrently with the sulfate control routine. FIG. 5 illustrates a deviation control example. "Adjustment" refers to the amount of acid decreased or can be converted to the amount of rock decreased using the set ratio formula.

Definition of Terms for Sulfate Control

Target

The target value is a manual input to the program and is the sulfate concentration (% wt. excess sulfate) desired at a particular point in the attack tank, such as typically in the fifth compartment of an 8 compartment attack tank.

Measured SO₄

The measured SO₄ (sulfate) value (% wt. excess sulfate) is a calculated input to the program. It may be based on the turbidity measurement of a sample from the particular point in the attack tank for which the target is meant and is prepared by the plant operator.

Time of Entry

The current dock time on the computer when a new value is entered for turbidity.

Time of Sample

The current clock time on the computer when a button push has been detected on a momentary contact switch located by the sample port of the fifth compartment in the attack tank from which the sample is taken.

Minutes Between Entries

Calculated by difference from the clock times of the current and previous sample entry times.

Sample Delay

Calculated by difference from the clock times of the sample entry time, and the sample push button time (time when the sample was taken). This value is assumed to be 12 minutes if a button push is not detected.

Total H₂SO₄ (gallons)

This value is obtained by totalizing or integrating with respect to time the sulfuric acid flow rates. The totalizer is reset to zero when a sample entry value is detected.

Total Dry Rock (tons)

This value is obtained by totalizing or integrating the Dry Tons per Hour value. The totalizer is reset to zero when a sample entry value is detected. The Dry Rock Tonnage value is calculated within the local control loop from the rock slurry density and flow rate values.

Average H₂SO₄ (GPM)

This value is calculated as the total number of gallons of acid added between the samples divided by the time between sample entries.

Average Rock (DTPH)

This value is calculated as the total dry tons of rock added between the samples divided by the time between sample entries.

Offset to Acid Set Point

The offset is a correction factor for rate changes and differs from plant to plant. The offset must be determined empirically. It may be determined by one skilled in the art based on past plant information or statistical analysis of past plant performances. Determining the offset is within the ability of one of ordinary skill in the art. For one plant the offset is preferably 25. The acid set point is the new desired acid flow rate (which has been determined to produce an excess sulfate level based on entering rock and acid to be equal to the target) and is measured in gallons per minute.

$$Acid\ set\ point = Offset + (Rock\ dtph * Set\ ratio) \quad (8)$$

The rock dtph refers to the actual rock rate in dry tons/hour, and is set manually by the plant operator. Rock dtph may also be referred to as the plant speed.

Acid Excess

This is the amount of H₂SO₄ added during the last time period in excess of the acid calculated from the offset and set ratio formula above. The units are in gallons of H₂SO₄ and the value is calculated as follows:

$$Acid\ Excess = [((Total\ H_2SO_4 - Offset * dt)/Total\ Rock) - Set\ Ratio] * Total\ Rock \quad (9)$$

The variable dt is the amount of time between sample entries in minutes.

Calc Acid

This value represents the gallons of H₂SO₄ required to change the concentration in the attack tank from the sulfate concentration of the last Predicted SO₄ to the concentration indicated by the current Measured SO₄. The difference between the last Predicted SO₄ and the current Measured SO₄ is multiplied by a factor representing the attack tank volume and several unit conversion factors.

$$Calc\ Acid = (current\ Measured\ SO_4 - last\ Predicted\ SO_4) * 1840 \quad (10)$$

The last predicted SO₄ is the predicted SO₄ for the previous sampling period.

Theory Acid

This is the theoretical amount of H₂SO₄ added to the attack tank in excess of the set ratio calculation during the period between when the sample was taken and when the lab analysis were entered. A delay period of 12 minutes is assumed. This value is replaced by the actual amount of acid added in excess of the set ratio calculation if the sample button was used when the sample was taken. The units are in gallons of H₂SO₄. The value is determined by integration of the K pulse curve in the theory mode and by the difference in the two acid totalizer readings when the sample button is used. The theory value is calculated as follows:

$$Theory\ Acid = 24 * K\ value * (exp[(12 - dt)/24] - exp(-dt/24)) \quad (11)$$

where the time constant for the K pulse curve is 24 minutes and dt is the time between sample entries in minutes. The theory value is replaced by a value calculated from the acid totalizer if the sample button was used. The calculation for the sample button mode is as follows:

$$Est.\ Acid = Total\ Acid\ at\ Sample\ entry - Total\ Acid\ at\ Button\ Push \quad (12)$$

$$Est.\ Rock = Total\ Rock\ at\ Sample\ entry - Total\ Rock\ at\ Button\ Push \quad (13)$$

$$Theory\ Acid = ([Est.\ Acid - Offset * Delay]/Est.\ Rock - Set\ Ratio) * Est.\ Rock \quad (14)$$

Add Acid

This value is the amount of H₂SO₄ added to the attack in excess of the Set Ratio calculation during the time period from when the previous sample data was entered until the current sample was taken. The units are in gallons of H₂SO₄ and it is calculated as follows:

*Add Acid=Acid Excess−Theory Acid*

Base $SO_4$

This value is a calculated sulfate content for the attack tank and is the assumed base concentration level for extrapolating the Predicted $SO_4$ sulfate concentration. It is calculated by adjusting the current Measured $SO_4$ value by the amount of $H_2SO_4$ added in excess of the Set Ratio amount from the last sample entry until the current sample was taken. The equation is as follows:

$$Base\ SO_4 = Measured\ SO_4 - [Add\ Acid/(Gain\ factor * 1840)] \qquad (15)$$

Predicted $SO_4$

This value is the predicted sulfate calculation at the time the sample data is entered. The predicted concentration is calculated by adjusting the Base $SO_4$ concentration by the amount of $H_2SO_4$ added in excess of the Set Ratio from the last sample entry. The value is calculated as follows:

$$Predicted\ SO_4 = Base\ SO_4 + [Acid\ Excess/(Gain\ factor*1840)] \qquad (16)$$

$ExSO_4$

The $ExSO_4$ value is the sulfate concentration expected for the current Measured $SO_4$ value. The value is used to determine if Gain Factor adjustments are required.

$$ExSO_4 = Target - (22.3*K\ Value - Acid\ Excess)/(Gain*1840) \qquad (17)$$

Up/Down Counts

These values are integer counters indicating the number of sequential adjustments that were less than or greater than the amount required to maintain the target sulfate concentration. Up down counts are values that reflect the number of adjustment pulses in a row that were unsuccessful in correcting the sulfate level. The criteria to determine the adjustment performance is as follows:

$$IF\ last\ Predicted\ SO_4 < Target\ THEN\ Test\ A = 1 \qquad (18A)$$

$$IF\ current\ Predicted\ SO_4 > ExSO_4\ THEN\ Test\ B = 1 \qquad (18B)$$

$$IF\ Test\ A + Test\ B = 1\ THEN\ Up\ Count = Up\ Count + 1\ ELSE\ Up\ Count = 0 \qquad (18C)$$

$$IF\ Test\ A + Test\ B \neq 1\ THEN\ Down\ Count = Down\ Count + 1\ ELSE\ Down\ Count = 0 \qquad (18D)$$

Gain Factor

This value is an adjustment sizing factor used to determine the amount of $H_2SO_4$ required to change the attack tank sulfate concentration by 1.0%. Various unit conversion factors are incorporated in the Gain factor's constant multiplier of 1840 to allow the factor to normally vary between a value of 1.0 and 2.0. The Gain Factor is adjusted according to the following criteria:

$$IF\ Up\ Count > 3\ THEN\ Gain\ Factor = Previous\ Gain\ Factor + 0.025 \qquad (19A)$$

$$IF\ Down\ Count > 3\ THEN\ Gain\ Factor = Previous\ Gain\ Factor - 0.0099 \qquad (19B)$$

$$Gain\ Factor = Previous\ Gain\ Factor * 0.999 \qquad (20)$$

These formulas adjust the gain factor which adjusts the size of the acid pulse. The gain factor is increased, which increases the size of the acid pulse, if the last 4 acid pulses were too small. Similarly, the gain factor is decreased where the acid pulse was too large (overcorrected the excess sulfate) for the last 4 sampling periods. The last equation of this set was added after the original installation. It is designed to keep the system in an overdamped condition where Up Counts are required to maintain the adjustment size. The prior advisory system could only reduce the adjustment size through continued oscillation which amplified process upsets.

Combine Factor

This value represents the percentage of the last Actual Ratio to be combined into the calculation of the next Set Ratio. The combine factor is the absolute value of the average of the last two Delta values where the Delta values are the difference between the Measured $SO_4$ value and the Target. The Delta values are limited to a maximum value of 0.4, a minimum of −0.4. The Delta and Combine Factor are calculated as follows:

$$Old\ Delta = Delta \qquad (21A)$$

$$Delta = Measured\ SO_4 - Target \qquad (21B)$$

$$IF\ Delta > 0.4\ THEN\ Delta = 0.4 \qquad (21C)$$

$$IF\ Delta < -0.4\ THEN\ Delta = -0.4 \qquad (21D)$$

$$Combine\ Factor = abs\ (Old\ Delta + Delta)/2 \qquad (21E)$$

The combine factor is a value indicating the difference between measured $SO_4$ and the target for the last 2 samples.

Actual Ratio

The Actual Ratio represents the acid demand required by the rock feed entering the attack tank during the last sampling period. It is calculated from the acid and rock totalizers and adjusted for attack tank $SO_4$ concentration changes during that sampling period as follows:

$$Actual\ Ratio = (Total\ H_2SO_4 - Offset*dt - Calc\ Acid/)/Total\ Rock \qquad (22)$$

Historic Ratio

The Historic Ratio is a long term exponentially weighted average of the Actual Ratio values. The Historic Ratio is somewhat shielded from highly variable Actual Ratios by substituting the last Actual Ratio for the current Actual Ratio if the current Actual Ratio value deviates from the Historic Ratio value by some set amount, e.g., greater than 0.03 or approximately 2%. The calculations are as follows:

$$Last\ Ratio = last\ Actual\ Ratio \qquad (23A)$$

IF abs(current Actual Ratio − last Historic
Ratio)<0.03 THEN Last Ratio=current Actual
Ratio     (23B)

$$Historic\ Ratio = 0.875*last\ Historic\ Ratio + 0.125*Last\ Ratio \quad (23C)$$

A number of different formulas could be used to calculate a historic ratio.

Set Ratio

The Set Ratio is the acid demand per unit of rock that has been calculated to cause the level of excess sulfate from the reaction incoming acid and rock to be equal to the target level of excess sulfate. The Set Ratio value is used to calculate the Acid gpm set point during the next sampling period. The units are gallons per minute of $H_2SO_4$ per dry ton per hour of Rock and the value is calculated by combining the Historic and Actual Ratios in the percentages indicated by the Combine Factor as follows:

$$Set\ Ratio = Combine\ Factor * Actual\ Ratio + (1 - Combine\ Factor) * Historic\ Ratio \quad (23D)$$

The Set Ratio is calculated from the actual ratio and the Historic Ratio. The combine factor causes the Set Ratio to be more heavily weighted toward the historic ratio if the measured $SO_4$ is equal to or close to the target. If the measured $SO_4$ is very close to the target, then large adjustments in the set points are probably not necessary because the plant is operating at or near the target level of excess sulfate. Thus, the set Ratio will be equal to the historic if the measured $SO_4$ is equal to the target. If the measured $SO_4$ is not close to the target, the set Ratio is weighted more towards the actual ratio because the historic ratio no longer accurately reflects the current needs of the plant. This may occur, for example, where an instrument has been recalibrated, or where there is a sudden change in the Rock quality.

K Value

The K value is a sizing constant to an exponential decay time function and the actual value is determined by the amount of $H_2SO_4$ required to be added or subtracted (using the k-pulse) to obtain the target sulfate concentration in the attack tank. The time function is an exponential natural decay function with a time constant preferably of 24 minutes which generates a series of values ranging from 1.0 to 0.0 over a 120 minute period. In the preferred embodiment of the present invention, the time function is limited to a maximum value of 0.65 to generate a plateau region for approximately the first 10 minutes. The value of the integral of the time function is 22.3 units, therefore a K Value of 1.0 (which is limited to 0.65 by the time function) supplies 22.3 gallons of $H_2SO_4$. The Acid Pulse is calculated as follows:

$$K\ Value = (Target - Predicted\ SO_4) * Gain\ Factor * 1840/22.3 \quad (24A)$$

$$Time\ Function = exp(-t/24) \quad (24B)$$

IF Time Function > 0.65 THEN Time Function = 0.65     (24C)

Thus, the time function is limited to a maximum value of 0.65 and effectively caps off the acid pulse for approximately 10 minutes before it begins to effectively decay.

$$Acid\ Pulse = K\ Value * Time\ Function \quad (25)$$

Figure 6:
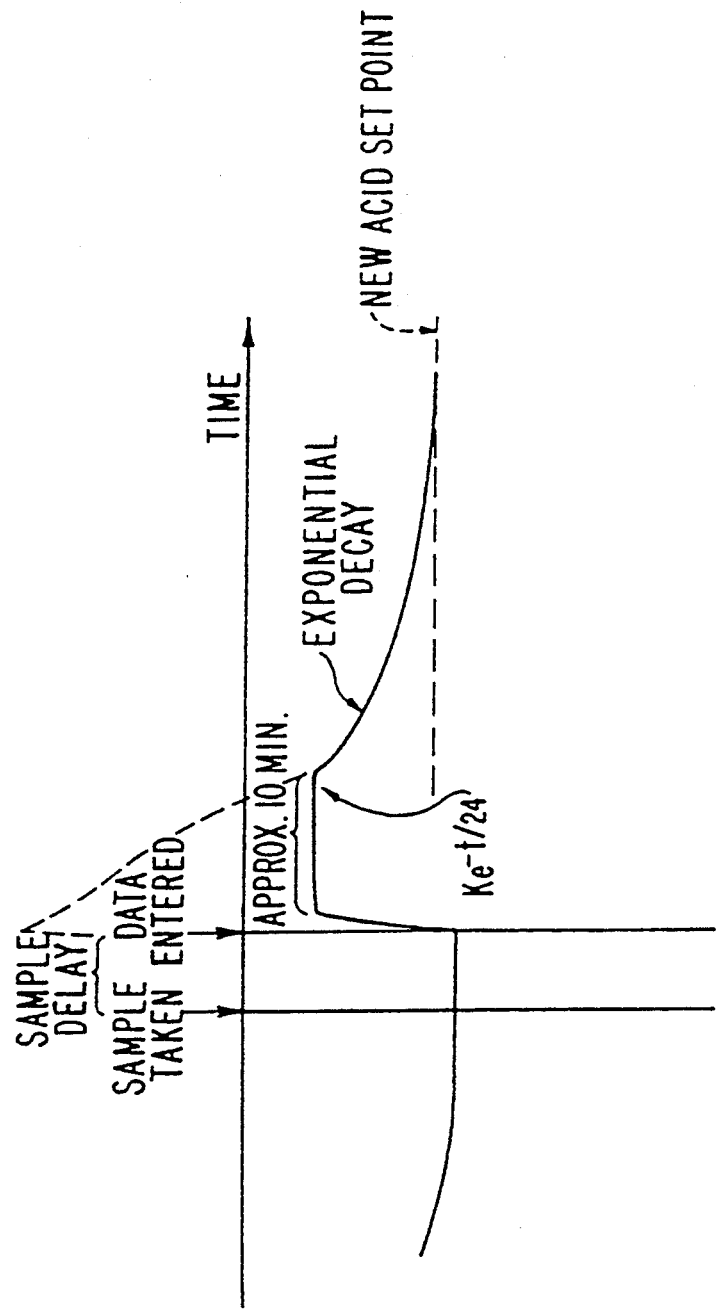
FIG. 6 is an acid pulse and exponential decay to a new acid set point of a preferred embodiment of attack tank control of the present invention.

The Acid Pulse is a (positive or negative) $H_2SO_4$ pulse followed by an exponential decay to the new acid set point. FIG. 6 illustrates how the overall acid feed rate varies from an acid pulse and then decays to the new acid set point. The Acid Pulse is combined with the calculations from the Set Ratio and Offset calculations to produce the overall acid feed rate which is downloaded to acid control and measurement device 132 and acid pump 146 for the next sampling period according to the following:

$$Overall\ Acid\ Feed\ Rate = Acid\ Pulse + Acid\ Set\ Point \quad (26A)$$

$$Overall\ Acid\ Feed\ Rate = (K\ Value * time\ function) + (Rock\ Set\ Point * Set\ Ratio + Offset) \quad (26B)$$

The advantage of a square pulse (through limiting the exponential function) followed by an exponential decay as opposed to only an exponential function is that the square pulse allows the attack tank to be adjusted quickly but does not require the controllers and pumps to attempt to make the extremely rapid adjustments necessary to track the steep exponential decay during the first few minutes (without square pulse). The acid pulse and decay of this method allows the attack tank to be quickly adjusted without forcing the controllers and pumps to respond in a manner which may be physically impossible. In addition, a computer controlled pulse and exponential decay provides increased safety over a manual system. Computer 130 calculates the appropriate values for the acid pulse and decay and transmits control signals to acid control and measurement device 132. This method is self limiting because it decays to the set point. A manual increase in acid feed rate is prone to errors because it requires the plant operator to monitor the acid feed rate and manually readjust the feed rate back to the acid set point after the acid adjustment is made.

As described earlier, once data is entered, the deviation control program increases the allowed deviation between the overall acid feed rate and the actual feed rate to allow for devices, controllers and pumps to adjust. This allowed deviation is then decreased to force the actual acid feed rate to be approximately equal to the overall acid feed rate. Throughout the entire process, computer 130 is constantly polling (sampling) the acid and rock feed rates. Even though the actual acid pulse may be slightly delayed or have a slightly different shape, the actual number of gallons of acid (and tons of rock) added is still known due to the continuous totalizing or integration of both feed rates. The totalized number of gallons added is used in subsequent calculations to maintain the excess sulfate level as close as possible to the target.

In a previously used advisory program, the computer had to rely on estimates of the amount of acid (based on the acid set point) added because integration and polling were not performed. Thus, in related systems, the actual number of gallons added was never actually known. The automatic control method described herein overcomes these disadvantages. In addition, this method allows the pulse of acid to be added and then decrease to the new acid set point much faster than the advisory program. The method of calculating set points and the acid pulse is also much more sophisticated and allows for more accurate control to the target. FIG. 7 illustrates data for calculations of ten sampling periods.

The foregoing steps, operations and calculations may be performed to operate the automatic control system. In a preferred embodiment, most of these steps, operations and calculations may be performed by programming a computer to perform them. Such programming techniques would be well known to a computer programmer of ordinary skill. It should be understood that the various steps, calculations and constants may be reasonably altered while still calculating feed rates and other adjustments necessary to operate a reaction at a desired target or at maximum efficiency as taught by the present invention.

FIG. 8 illustrates a sequence of steps that may be performed to operate the automatic control system of the present invention. Specifically blocks 150-164 of FIG. 8 illustrate a sequence of steps to perform sulfate control on a phosphoric acid plant according to the teachings of the present invention. In block 150, the operator takes a sulfate sample at the end of a sampling period, preferably from the fifth compartment of an eight compartment attack tank. The sulfate level is measured using well-known techniques, such as through the use of a turbidimeter. The measured value of sulfate ($SO_4$) is then entered manually into computer 130.

In block 152, computer 130 calculates the total amounts of rock and acid added to the reactor over the most recent sampling (time) period through integrating the acid and rock feed (flow) rates. A new sampling period begins when sulfate data is entered into computer 130.

In block 154, computer 130 calculates the actual ratio which is a value representing the acid demand per unit of rock required by the rock for the data of the current sample being processed (current actual ratio).

In block 156, computer 130 calculates the (new) historic ratio as a fractional combination of the previous or last historic ratio and the actual ratio for either the current sample or the last sample. The actual ratio which is selected for use in the calculations depends on how much the current actual ratio differs from the last historic ratio. Because large changes in the sulfate level over a short period of time are unlikely, the current actual ratio will be ignored if it is much different than the last historic ratio, and the actual ratio for the previous sampling period will be used in the calculation. This method is based on the assumption that a large change in sulfate level is most likely an erroneous measurement if it occurs only once, but much more likely to be accurate if it occurs twice or more in a row. According to this method of calculating the new historic ratio, the actual ratio that has a large deviation from the previous historic ratio will be used in the calculation only where it occurs twice in a row.

In block 158, computer 130 calculates the set ratio from the combine factor, the actual ratio and the historic ratio.

In block 160, computer 130 calculates the new acid set point from the rock set point, set ratio and the offset. Blocks 154-160 are steps which may be performed to calculate the new acid set point.

In block 162, computer 130 calculates the K value for sizing the acid pulse. The K-value is calculated from the target, predicted $SO_4$ and the gain factor. The predicted $SO_4$ and the gain factor must be determined by computer 130 prior to calculating the K-value.

In block 164, computer 130 sends control signals to devices 132 and 146 to adjust the actual acid feed rate in order to institute the calculated acid pulse (from the calculated K-value) and to preferably decay to the calculated acid set point.

In addition to the sequence of steps shown in FIG. 8 for sulfate control, the automatic control system of a preferred embodiment of the present invention also performs deviation control concurrently with sulfate control. Deviation control is the adjustment of the actual feed rates so that the actual feed rates are within some allowed deviation from their respective set points. The allowed deviation is set to a maximum when a new acid pulse and set point are instituted to give the pumps and controllers time to adjust. This allowed deviation decreases over time to force the actual feed ratio to be very close to their respective set point ratio. If the deviation exceeds the allowed deviation, then the appropriate feed rate is decreased to compensate for the error.

Figure 9:
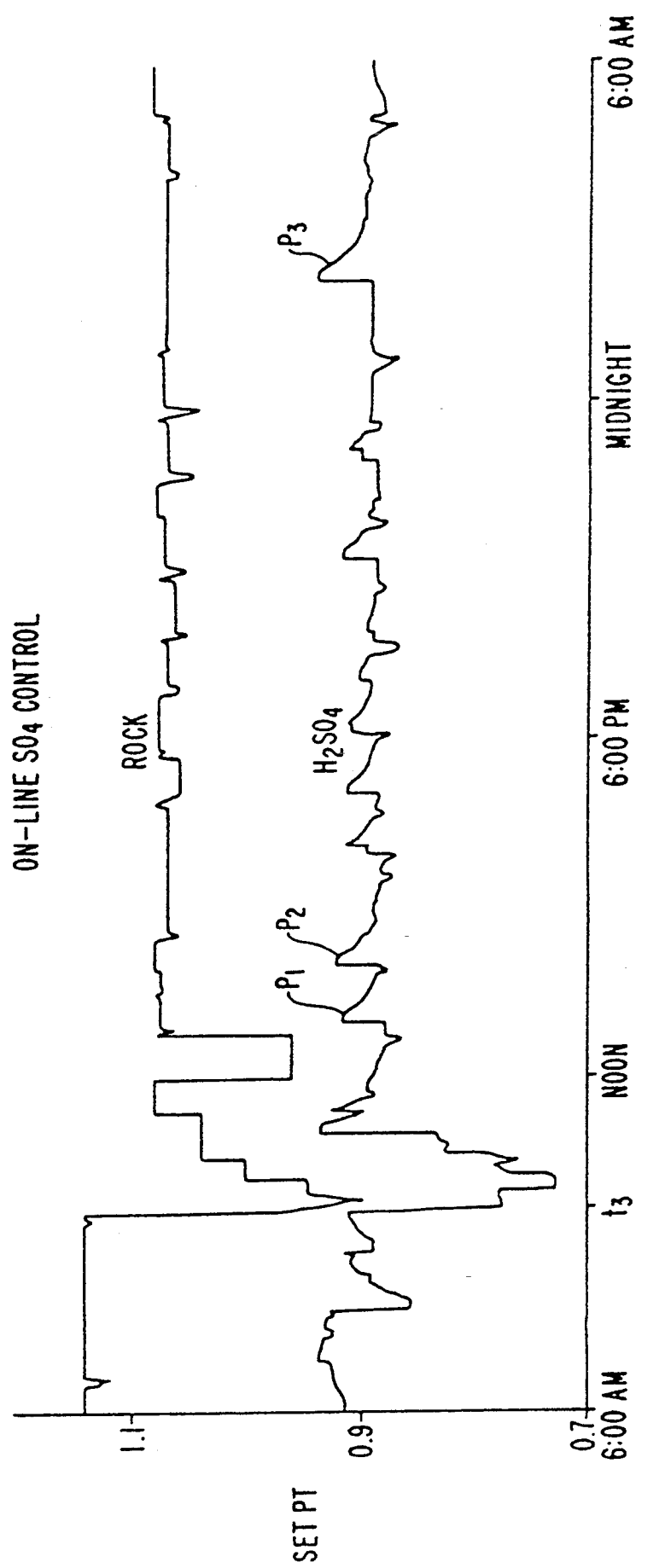
FIG. 9 is a graphical diagram of the time varying acid and rock flow rates for a phosphoric acid plant using a preferred embodiment of attack tank control of the present invention.

FIG. 9 is a graphical display of how the rock mass flow rate and the acid feed rate vary with time for this method. For example, at time=t3, the rock mass flow rate decreases rapidly. This change was made by the operator in response to some outside problem such as the product tank was full or the filter was not filtering properly. The acid rate at approximately 13 undergoes a negative acid spike to compensate for this decreased rock mass flow in order to maintain the desired set ratio. Acid pulses p1, p2 and p3 each illustrates an acid pulse followed by an exponential decay. Alternatively, the rock mass flow rate may be adjusted by itself or along with the acid feed rate in order to maintain the set ratio.

Figure 10:
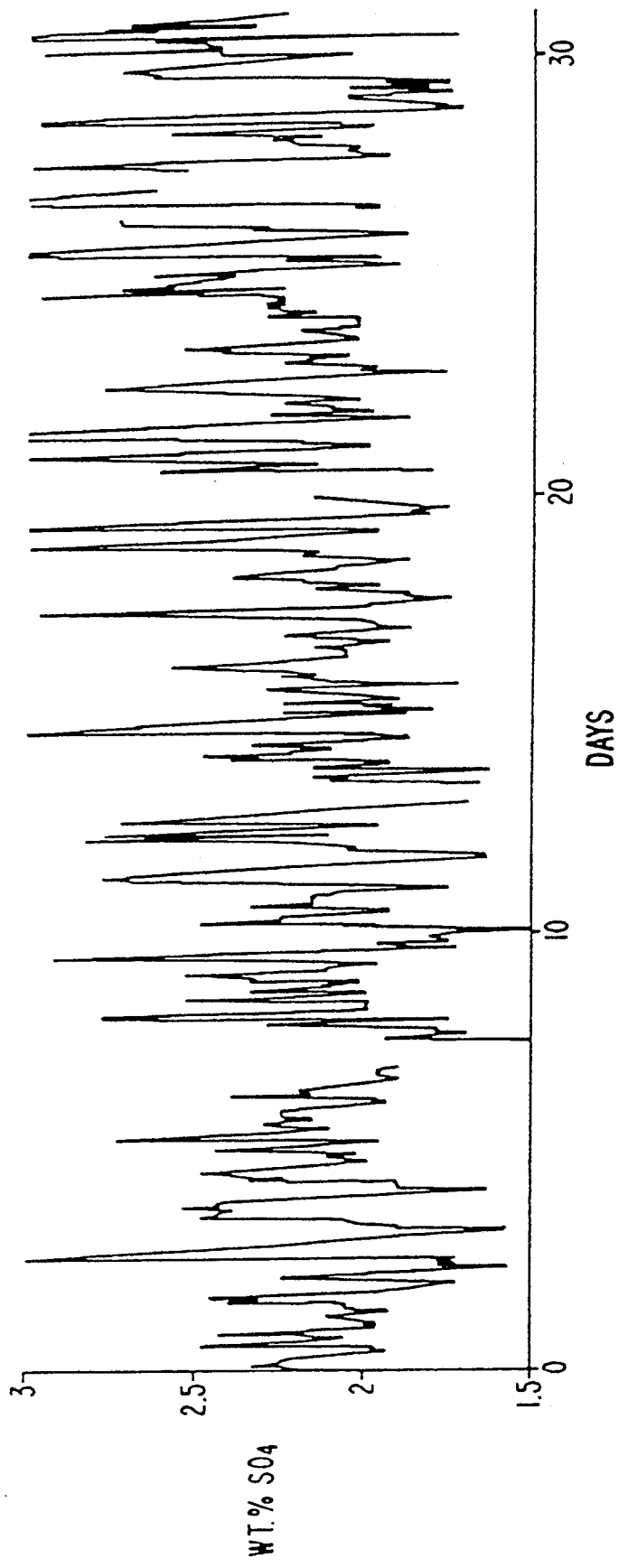
FIG. 10 is a graphical diagram of the time varying excess sulfate for a phosphoric acid plant not using a preferred embodiment of attack tank control of the present invention.
Figure 11:
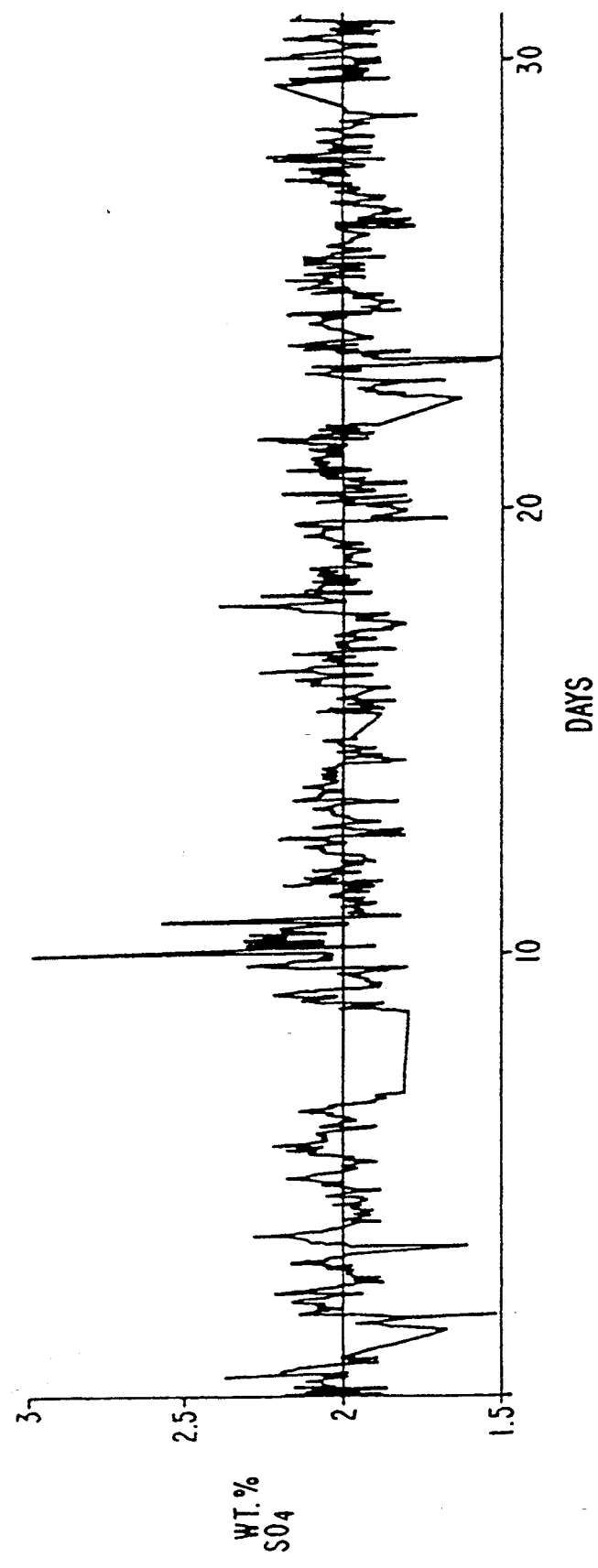
FIG. 11 is a graphical diagram of the time varying excess sulfate for a phosphoric acid plant using a preferred embodiment of attack tank control of the present invention.

FIGS. 10 and 11 illustrate how the weight percent excess sulfate varies over time when no computers were used (FIG. 10) and after the method was implemented (FIG. 11). A phosphoric acid plant using the automatic control system described herein shows a decreased sulfate deviation and allows the control to an average excess sulfate value (2.0%) which for this example had been shown to give maximum efficiency. Using the present method, the standard deviation around the desired sulfate level has been decreased by 80 percent.

A preferred method for controlling the quantity of water delivered to the attack tank is set forth in U.S. Pat. No. 5,188,812, which is incorporated herein by reference. There exist other suitable methods for controlling and introducing water into the filter and the attack tank.

Although any method of controlling the level in the attack tank can be utilized, it has been discovered that a method for controlling the level in the attack tank can be combined with the preferred methods for controlling both the operating regime of the attack tank and the water flow rate to the attack tank. Control of the rate at which water is introduced to the attack tank also controls the concentration, or strength, of the phosphoric acid product. Thus, this control method also is called the phosphoric acid strength control. When the preferred method for controlling the quantity of water delivered to the attack tank is combined with the level-controlling method of the invention, the former method is modified as set forth herein.

In accordance with the method of the invention, the level in the attack tank is controlled in significant part by adjusting the set point for the attack tank dry rock feed rate. The dry rock addition rate, typically expressed in units of tons per hour, is manipulated by monitoring on-line rock density and controlling the rock slurry flow rate, as set forth above. The level control program also shares control of the filter bypass water rate 45 with the phosacid strength control by monitoring the overall attack tank water balance generated by that method of strength control. Control over the water addition rate is particularly important because water comprises a significant fraction of the total attack tank feed.

The level control method of the invention can be used to control any type or style of attack tank. As described above, attack tanks can be made up of an arrangement of baffled compartments, and may have agitation. Other arrangements include a single large compartment, typically agitated; an assembly of individual tanks placed in series, in parallel, or in combination; and arrangements wherein the individual tanks or compartments are equal or unequal in volume.

One popular arrangement incorporates a "filter feed" compartment, i.e., a compartment into which flows the content of the other compartments which form the attack tank before the product slurry is fed to the filter. In such an arrangement, the main compartments in the attack tank may be arranged in a manner so that the level therein is maintained at a predetermined level, with the contents flowing to the filter feed compartment, which typically is maintained at a separate level.

Typically, in such an arrangement, the contents from the main compartments flow by gravity over a weir into the filter feed compartment. Thus, the main compartments are maintained at a relatively constant level by the weir, and the level in the filter feed compartment varies. It is the level of the filter feed compartment which typically is monitored and controlled in accordance with the method of the invention. It is this control which is referred to as the attack tank level control.

Level in the filter feed compartment, and the magnitude of acceptable variation therefrom, will differ from plant to plant. The inventor has found that level variations in the filter feed compartment of the attack tank that provide a volume difference of between about 0.5–2 percent of the total attack tank volume, more typically between about 1–1.5 percent of that same volume, provide a suitable operating range for control of level in the attack tank. Skilled practitioners will be able to determine suitable level variations with the guidance provided herein.

Throughout this specification and claims, the endpoints of the range of acceptable variation in filter feed compartment level will be denominated highest and lowest acceptable levels. The plant likely will continue to operate if the level is above the highest acceptable level or lower than the lowest acceptable level, but significant measures typically are taken to correct the situation which caused the level aberration. Some of these measures are described herein.

In accordance with the method of the invention, rock rate adjustments are based on the volumetric difference of flow rates entering and leaving the attack tank, the estimated attack tank water balance, the flow rate of filter bypass water, and the filter feed compartment level. The attack tank level 28 is controlled by comparing the difference between the total volume per unit time of materials introduced into (the sum of flows measured at 15, 25, 35, 45, and 55) and removed from slurry rate 65 the attack tank (VOLIN and VOLOUT) and the expected average volume difference between total attack tank feed rate and product slurry rate. This expected average volume difference is the volume difference per unit time caused, for example, by the reduction in volume upon mixing of the acid and water streams and by evaporation from the attack tank. This expected average volume difference, AVD, is determined from historical data relating to each processing plant individually. Typically, the AVD is between about 5 and 20 percent, more typically between about 10 and 15 percent, of the volumetric fresh feedrate fed to the attack tank.

In accordance with the method of the invention, the average volume difference between the attack tank feed and product slurry streams now is calculated at relatively short intervals and compared to the change of the filter feed compartment level during that same interval. The exact length LT3 of the interval T3 is selected to provide a reasonable degree of control without overtaxing the controller. Typically, an interval of between about 2 and 30 minutes, preferably between about 4 and 15 minutes, and more preferably between about 5 and 10 minutes, is appropriate.

If the direction of change of the level 28 is not predicted when the actual volume difference is compared to the expected volume difference, the control parameter AVD is updated according to the following equations:

$$CK\ LEVEL = LEVEL2 - LEVEL1 \tag{27A}$$

$$VOL\ DIF = (VOLIN - VOLOUT)/LT3 \tag{27B}$$

If $CK\ LEVEL > 0$ and $VOL\ DIF < AVD$, then
$$AVD = (1-M1)*AVD \tag{27C}$$

If $CK\ LEVEL < 0$ and $VOL\ DIF > AVD$, then
$$AVD = AVD + M2 \tag{27D}$$

LEVEL1 and LEVEL2 are the levels in the attack tank at the start and end of the interval T3. CK LEVEL is the average change in level over the interval T3 and VOL DIF is the average volumetric difference between the feed and product slurry during that same period. M1 is relatively small, typically less than about 0.05, and preferably between about 0.01 and 0.02. M2 is selected to be equal to up to about 2 percent of the difference in volume flow into and out of the attack tank. Skilled practitioners can determine values for M1 and M2 within the guidelines presented herein to provide the desired degree of control.

Equation 27C uses a fraction of AVD, whereas Equation 27D adds a constant volume to AVD, to adjust AVD. Better control is achieved under the circumstances by requiring percentage reductions in one direction, e.g., to decrease the value of AVD, and incremental fixed increases in the other direction. The correction to AVD achieved by Equation 27C, wherein the level in the attack tank has been increased and the average volume difference between attack tank total feed volume and filter feed rate is less that the expected difference, is a small percentage reduction. However, a fixed incremental volume is added to AVD if attack tank level decreased, even though the actual volume difference is greater than the expected volume difference. This control technique allows gradual decreases, and relatively large increases in AVD.

If a percentage correction were used to calculate corrections with AVD under circumstances as set forth in Equation 27D, it would take a greater number of iterations to attain the desired operating point as AVD diminishes and approaches zero. Also, the correction technique described herein provides a method of adjusting AVD, an estimated or expected value based on historical data, to obtain better control.

As set forth above, the overall attack tank water balance is calculated, preferably by a computer, in accordance with the method described in U.S. Pat. No. 5,188,812, which is hereby incorporated by reference. In the method, the total quantity of water entering the attack tank from a plurality of sources is determined. A theoretical water requirement per unit mass of dry rock feed and information (in particular, phosacid concentration and sulfate concentration) from analysis of the content of the attack tank are considered. The total water quantity, theoretical water quantity, and attack tank content analyses are utilized to control the attack tank water balance.

In accordance with the method, the overall water balance is maintained by adjusting the flow rates of the filter wash water stream 5c and filter bypass water stream 4. The filter bypass water addition rate is adjusted, in accordance with the method of the invention, by the phosacid strength control method and the level control method.

When the phosacid strength control method of U.S. Pat. No. 5,188,812 is used in combination with the level control method of the invention, certain adjustments preferably are made in the strength control method. For example, the period over which bypass rams are adjusted is shorter than the water pulsing period utilized in that method. A period of about 20 seconds is satisfactory.

As set forth in U.S. Pat. No. 5,188,812, the content of the attack tank is analyzed periodically. The variables TOTAL NEEDED and TOTAL ACTUALLY ADDED are the totalized (totalled) volumes of water required and actually added, respectively, since the last sample analysis. The variable ATTACK ADJ is the volume of water required to offset any variation between the target phosacid concentration and the actual phosacid concentration as determined by the last sample analysis. Then Equation 28 represents the overall attack tank water balance, wherein the variable CKBYPASS is the total volumetric quantity (gallons) of water required in the attack tank to achieve the target phosphoric acid concentration.

$$CKBYPASS = TOTAL\ NEEDED - TOTAL\ ACTUALLY\ ADDED + ATTACK\ ADJ \quad (28)$$

A rolling average of the water balance over a period WT, typically about 1 or 2 minutes, can be calculated in accordance with Equation 29 for any time WDT shorter than the period, as follows:

$$PACE = PACE*(WT - WDT)/WT + WDT*(NEED - ACTUAL)/WT \quad (29)$$

wherein NEED and ACTUAL are the needed (desired) and actual water flow rates, respectively. Then, a set point (operating point) for bypass water flow rate, SETPASS, is established in accordance with Equation 30, as follows:

$$SETPASS = SETPASS + ((CKBYPASS - S1)/S2 + PACE)/S3 \quad (30)$$

S1, S2, and S3 are established to provide the desired degree of control. As can be seen, Equation 30 accommodates the interrelationship between the instantaneous water balance and the overall attack tank water balance. S1 typically is established as a quantity of water sufficient to reduce the phosacid concentration in the attack tank by about 0.2 wt percent. S1 always is a positive value because it is preferable to discourage use of bypass flow and to encourage use of water introduced to the attack tank through the filter. S2 is established at a value which further tends to introduce water through the filter and provide an appropriate balance between the instantaneous water balance and the overall attack tank water balance. Thus, S2 often has a value between about 1 and 5 percent of the numerical value of S1. S3 is established as a function of the correction frequency and to provide the desired degree of control. S3 decreases as the interval between corrections lengthens. In accordance with the guidelines presented herein, skilled practitioners will be able to establish values for S1, S2, and S3. It is good operating practice not to allow SETPASS, the volumetric water flow rate established by the level control method, to be less than a very small nominal value. A small flow rate through the line helps prevent blockages due to deposition of solids and encrustation of movable parts.

Preferably, the level control method of the invention accommodates three modes of operation, each related to the level in the filter feed compartment, as follows:

(1) High level mode—Filter feed compartment level is higher than the highest desirable level. Rock rate increases are not permitted. Reductions in rock rate required by a difference in the volumetric flow rates into and out of the attack tank, the filter feed compartment level, and the rate of flow on the filter bypass water line, are permitted.

(2) Target level mode—In this normal operating mode for the level control, rock rate increases and decreases demanded by difference in volumetric flow rates, the overall water balance, and the rate of flow through the filter bypass water line are permitted.

(3) Low level mode—Filter feed compartment level is lower than the lowest desirable level. Rock rate decreases are not permitted. Increases in rock rate required by a difference in the volumetric flow rates into and out of the attack tank and the filter feed compartment level are permitted.

In accordance with the method of the invention, both the total volume and the composition of the feed material entering the attack tank is controlled by the amount of product slurry delivered to the filter. As the description of the method sets forth, the greatest freedom to optimize the rock and water addition rates under the overall water balance is available when the filter feed compartment level is maintained within the target level, i.e., between the highest and lowest acceptable levels. Optimum water usage minimizes bypass water flow rate, maximizes the filter wash water flow rate, and maintains the desired phosphoric acid strength in the attack tank. The optimum water balance will usually result in maintenance of the attack tank level at the minimum acceptable level at high filter wash water rates and at the maximum acceptable level at low filter wash water rates.

The level control relationships are evaluated periodically at intervals of LT length. A period of five minutes is appropriate, although other periods can be used. The filter feed compartment level establishes the relationship between the bypass water rate and the rock feed rate. If the filter feed compartment is within the target level, the following relationships apply in accordance with the method of the invention.

The adjustment to the rock addition rate, ADTH, in dry tons per hour, is determined as follows:

$$ADTH = (AVD - VOL\ DIF)/R1 - CKBYPASS/V1 \qquad (31)$$

$$ADTH = ADTH - K1*SETPASS/WATRATIO \qquad (32)$$

wherein R1, V1, and K1 are tuning constants and WATRATIO is the theoretical water requirement per unit (typically per ton) of dry rock added to the attack tank.

The tuning constants are established to provide the desired degree of control. R1 is related to the total feed volume required per unit of rock feed and to the time interval, and decreases as the time interval lengthens. V1 often is approximately equal to the volume of water required to cause the phosphoric acid concentration in the attack tank to change 0.2 percent. K1 is utilized to discourage use of bypass flow, but not so severely that the filter is overwashed. Thus, K1 typically is less than about 0.5, more typically between about 0.2 and 0.4. The value of WATRATIO is the quantity of water required per unit of rock feed and is determined from historical data and from analytical results. WATRATIO is utilized to predict the quantity of water necessary to make phosacid of the desired strength.

Equation 31 establishes a rock rate adjustment based on the difference in volume between the feed introduced to and product slurry removed from the attack tank and the attack tank water balance. Note that the value of CKBYPASS is negative when too much water has been added to the attack tank. The relationship established in Equation 31 would demand a rock rate increase to take advantage of excess water present in the attack tank, rather than require a reduction in wash water in the filtration section. Therefore, operation in accordance with the method of the invention is desirable because it affords the opportunity to maximize plant throughput by increasing attack tank feed rate, rather than requiring reduction in filter operation rate.

Equation 32 reduces rock addition rate if bypass water is being used to supply water to the attack tank. Use of bypass water, which bypasses the filter and therefore does not serve to recover phosphorous values which otherwise will be lost to the gypsum product, should be minimized. If the total adjustment to the rock rate is negative and bypass water flow is being used, a reduction in bypass water flow (note that ADTH<0) in accordance with Equation 33 will be required in accordance with the method of the invention, as follows:

If $ADTH<0$,
$$AWAT = AWAT + ADTH*WATRATIO*K2 \qquad (33)$$

wherein K2 is to be established for each plant to provide the degree of control desired. K2 is selected to provide that fraction of the water requirement of the attack tank that is not provided by the rock slurry. Thus, K2 is always less than 1.0, but will approach 1.0 if dry rock, rather than a rock slurry, is introduced into the attack tank. Thus, for example, a value of K2 of between about 0.6 and 0.7 yields suitable results when between about 30 to 40 percent of the required water is introduced as part of the rock slurry.

Equations 34 and 35 quantify the increase in bypass water flow necessary when ADTH>0, to accommodate the quantum of the rock rate increase. The water required per unit of rock, and the attack tank water balance, determine the quantity of additional bypass water required. In these equations, D1 and D2 are numerically equivalent to values of volumetric deficits of water to be supplied to the attack tank by bypass flow, with D2>D1. K3 and K4 represent multipliers having value between 0 and about 1, with K3>K4.

If $CKBYPASS>D1$ then
$$AWAT = AWAT + ADTH*WATRATIO*K3 \qquad (34)$$

If $CKBYPASS>D2$ then
$$AWAT = AWAT + ADTH*WATRATIO*K4 \qquad (35)$$

Equation 34 will increase the bypass water flow rate at a fraction K3 of the total water requirement per unit of rock addition if the water balance shows a deficit greater than D1. Equation 35 adds an additional K4 fraction to the total water requirement if the water balance shows a deficit greater than D2.

It should be noted that rock likely will be introduced in the form of an aqueous slurry. Therefore, additional quantities of water will be introduced, and the fraction of the total water requirement will be greater than (K3+K4), with the exact fraction depending upon the fraction of water in the slurry.

If the filter feed compartment level ACT.LEV is lower than the lowest acceptable level, the method below is used to calculate adjustments to the bypass water rate and the rock addition rate.

$$ADTH = (ADTH - VOL\ DIF + R2)/R3 + FACTOR*(LOLEV - ACT.LEV) \qquad (36)$$

R2, R3, and FACTOR are established in a manner similar to the manner R1, V1, and K1 are established. Typically, R1>R2>R3, and R2 is sized relative to R3 to ensure that ADTH is biased toward rate increases when the attack tank level is low. FACTOR is established to reflect the degree of confidence in VOL DIF as FACTOR is a direct multiplier on the level difference, which can be measured directly. Thus, FACTOR is large if the degree of confidence in VOL DIF is small.

If $CKBYPASS>D3$ then
$$AWAT = AWAT + ADTH*WATRATIO*K5 \qquad (37A)$$

If $CKBYPASS>D4$ then
$$AWAT = AWAT + ADTH*WATRATIO*K6 \qquad (37B)$$

If $CKBYPASS>D5$ then
$$AWAT = AWAT + ADTH*WATRATIO*K7 \qquad (37C)$$

If $CKBYPASS>D6$ then
$$AWAT = AWAT + ADTH*WATRATIO*K8 \qquad (37D)$$

If $CKBYPASS>D7$ then
$$AWAT = AWAT + ADTH*WATRATIO*K9 \qquad (37E)$$

The values of the tuning constants K3 through K9 and D1 through D7 all are related to the characteristics of the plant and to the degree of control desired over the system. The values of D3 through D7 are designed to provide a "layering" effect, and typically range in increasing numerical value from D3 to D7. Skilled practitioners realize that control of the bypass line 4 can be achieved by increasing or decreasing the number of "layers" or steps used to gradually increase the rate of flow in that line. For purposes of example, the embodiment described in the specification utilizes a four-step layering effect.

The values of D1–D7 typically depend on how far the concentration of phosacid in attack tank 20 is allowed to vary, i.e., a tolerance in phosacid concentration. For purpose of example, the concentration may be allowed to vary 0.5 percent above the target concentration and about 0.25 percent below the target concentration. Then, the steps in the method provide values of D3–D7 within this range. Thus, if the volume of attack tank 20 were about 1 million gallons, the value of D3 would be $-2500$; D4 may be about 0; D5 might be 2500; D6, 4000; and D7, 5000. The same guidelines apply to establishment of D1 and D2, which might provide for concentration changes of about 0.25 percent. Of course, skilled practitioners may prefer to establish other values within the guidelines established herein.

The values of K3 and K4 are established to provide adequate correction without overcontrol. Thus, K3 establishes the fraction of the water requirement that would be provided by the first correction. K4 demands a slightly smaller correction. The inventor has utilized values of 0.67 and 0.25 for these variables.

Typically, $K5=K6=K7=K8=K9$, because the same degree of adjustment is desired for each step. Further, it is preferred that the values for those K-values used to adjust the product $ADTH*WATRATIO$ be equal to the reciprocal of the number of steps between $CKBYPASS=0$ and the maximum value thereof. Thus, in the equations set forth above, it is more preferred that $K5=K6=K7=K8=K9$, and that each equal one divided by the number of steps in the positive range. Thus, for the preferred values set forth herein, the values of these K's preferably is 0.25.

As an example of the layering effect of Equation 37, if the water deficit at attack tank 20 is greater than D5, Equation 37A will require addition of K3 fraction of the total water requirement, Equation 37B will require addition of an additional K4 fraction of that requirement, and Equation 37C will require an additional K5 fraction. Thus, AWAT will be adjusted as follows:

$$AWAT=AWAT+ADTH*WATRATIO*(K5+K6+K7) \quad (B)$$

The rock rate increases calculated in Equation 36 are based primarily on the difference in volume between the feed and product flow rates, with additional increases based on the level. Increases calculated by the level term will grow larger if the level drops.

Because rock rate decreases are not allowed during periods of low level in the attack tank, if Equation 36 yields a negative value of ADTH, ADTH is set to zero. Bypass water flow increases are much higher during low level conditions to ensure that the overall water balance is maintained, i.e., that water is supplied in quantities sufficient to maximize plant throughput, during a period of operation in which many large water flow rate increases may be required. When the filter feed compartment level reaches the lowest acceptable level, the rates at which both rock and bypass water are introduced will be reduced until correct balance is attained.

If the filter feed compartment level ACT.LEV is higher than the highest acceptable level HILEV, the method below is used to calculate the adjustments for the bypass water rate and the rock rate.

$$ADTH=(AVD-VOL DIF-R4)/R5+FACTOR2*(HILEV-ACT.LEV) \quad (38)$$

R4, R5, and FACTOR2 are established in the same manner as were R2, R3, and FACTOR. If $ADTH>0$, i.e., if Equation 38 requires an increase in the rock rate, then ADTH is set to zero because, when operating at HILEV, rock rate increases are not allowed.

The rock rate decreases required by Equation 38 are based primarily on the difference in volume between the feed rate to and product slurry rate from the attack tank, with lesser effect given level control. However, as required by Equation 38, decreases attributed to the level term will grow larger if the level continues to rise.

Equations 39–41 require additional rock rate decreases ($ADTH \leq 0$) if the bypass flow rate remains a non-zero positive value, as follows:

If $SETPASS>0$ then
$$AWAT=AWAT+ADTH*WATRATIO \quad (39)$$

If $SETPASS+AWAT>0$ then
$$ADTH=ADTH-(SETPASS+AWAT)/(WATRATIO*K10) \quad (40)$$

K10 is related to the frequency at which Equation 40 is executed and is established to provide the desired rate at which rock rate is decreased to eliminate the need for bypass water. The maximum value of K10 therefore is 1, which would essentially immediately decrease the rock rate to eliminate the bypass requirement. Lesser values would lengthen the time required to decrease the rock rate.

Then, AWAT is calculated with the new value of ADTH, as follows:

If $SETPASS>0$ then
$$AWAT=AWAT+ADTH*WATRATIO \quad (41)$$

Thus, during periods of high level in the filter feed compartment, the method requires rock rate reductions until the water balance no longer requires bypass water flow.

Preferably, a limit is put on the maximum rock rate increases that can be made during an interval. Again, skilled practitioners recognize that such a limit is strongly dependent upon the characteristics of the plant and the desired degree of control. Such a limit also is related to the length LT of the interval.

Although it is possible to establish a fixed limit MAXLIM for the maximum rock rate increase, for example a fraction FR of the maximum rock feed rate RRMAX for the plant, preferably the adjustment limit is varied to better accommodate operating conditions. For example, MAXLIM can be related to RR, the rock rate at which the plant is being operated. With the guidance provided herein, skilled practitioners can establish an appropriate relationship for any plant.

A preferred relationship between RRMAX and RR, is set forth in Equation 42:

$$MAXLIM = RRMAX*(FR + P*(1 - RR/RRMAX)) \quad (42)$$

wherein FR and P are established for each plant based on the degree of control desired and the characteristics of the plant. For example, FR values between about 0.0025 and 0.025, preferably between about 0.005 and 0.010, and P between about 0.005 and 0.050, preferably between about 0.01 and 0.03, have been found suitable. Such a variable rock rate increase limit allows relatively large rate increases at low plant operating rates, yet limits rate increases to ever-decreasing quantities as the maximum rock feed rate is approached. The maximum rock feedrate for a particular plant, RRMAX, is established in accordance with local characteristics and requirements. For example, RRMAX may be limited by equipment limitations, such as attack tank volume, pumping capability, or filter capacity, or by other factors, such as governmental controls, lack of rock supply, or inability to supply sufficient water.

Similarly, a maximum rock feedrate decrease can be established as a function of both the maximum rock feed rate for the plant and, when the attack tank is operating in the high level regime, the bypass flow rate. Of course, each plant has a minimum rock feedrate dependent on the characteristics of the plant. The rock feedrate should not be allowed to fall below this minimum value.

As can be seen from the description herein, the method of the invention affords improved control as compared to known process control techniques. Therefore, the invention provides the opportunity to improve efficiency of operation and decrease, for example, filter operation speed. Alternatively, plant throughput can be increased. Further, practice of the invention provides better control of operation conditions and so affords the opportunity to operate a filter or a plant closer to the operability limit, i.e., with a smaller margin of safety.

EXAMPLE

Figure 18:
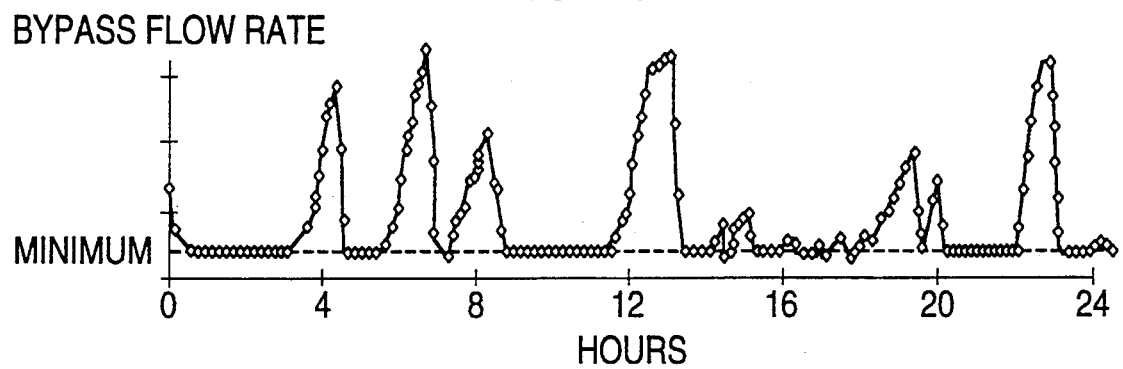

An example of control in accordance with the method of the invention of a wet process phosphoric acid plant, including the filter, is illustrated in FIGS. 12–18. The figures illustrate the interrelationships among first pass filtrate specific gravity (FIG. 12); the filter feed rate (FIG. 13); rock feed rate (FIG. 14); attack tank level (FIG. 15), sulfate concentration (FIG. 16), and $P_2O_5$ concentration (FIG. 17); and bypass flow rate (FIG. 18). Twenty-four hours of operation in accordance with the method of the invention are illustrated.

Figure 12:
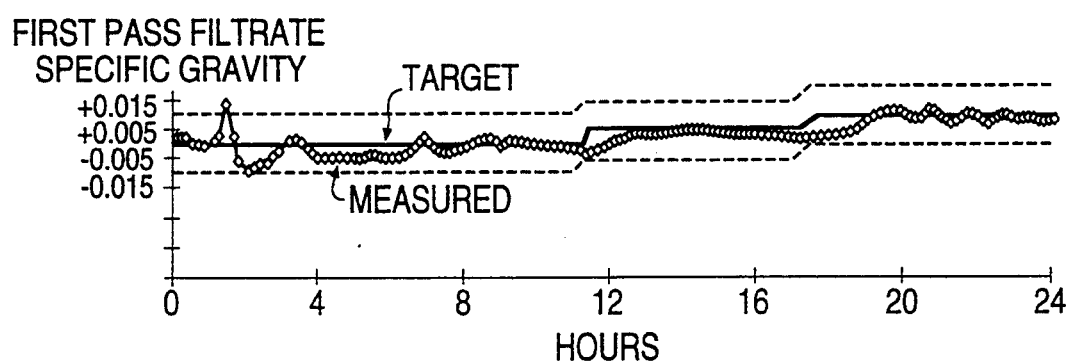
FIGS. 12–18 illustrate the control of a wet process phosphoric acid plant in accordance with a preferred embodiment of the invention.
Figure 13:
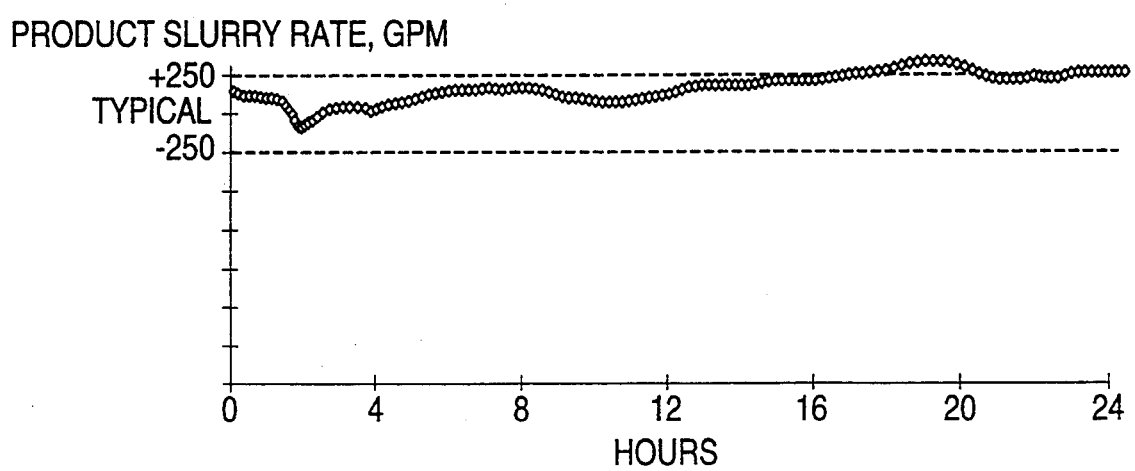
Figure 14:
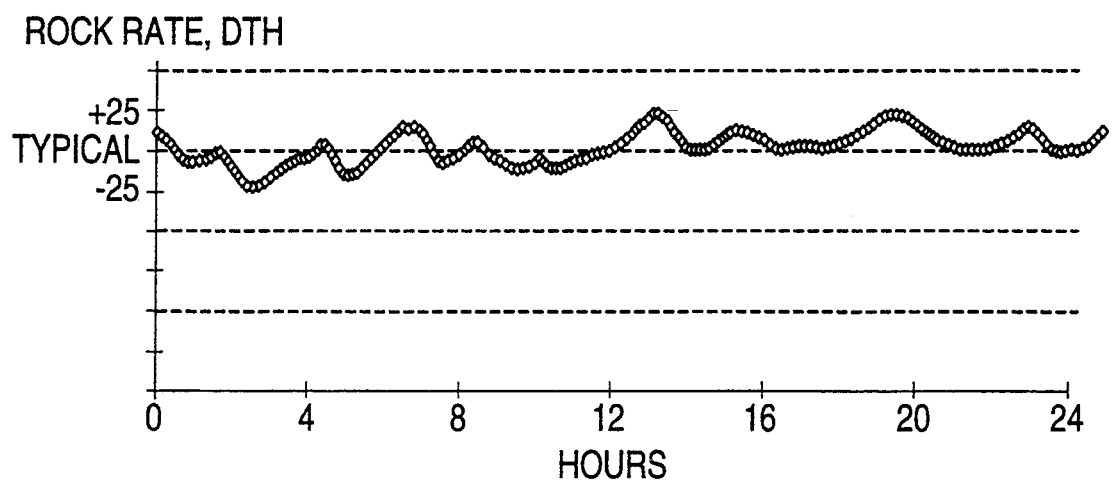
Figure 15:
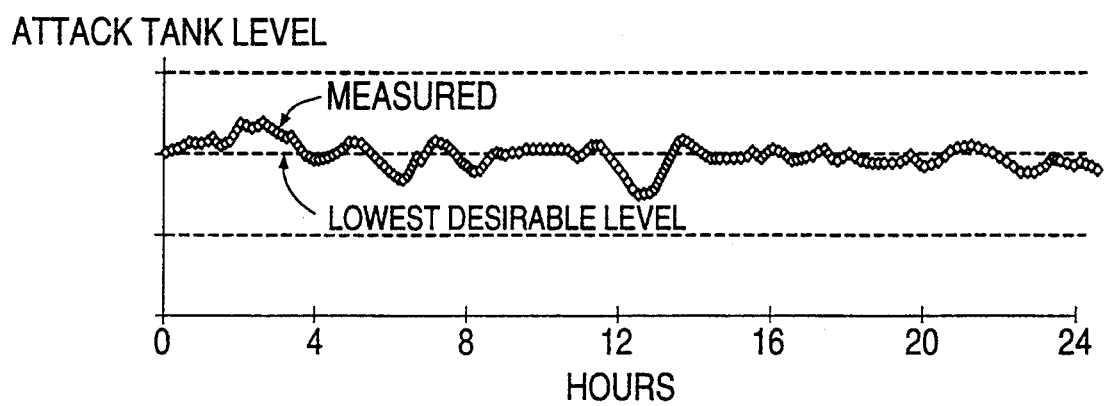
Figure 16:
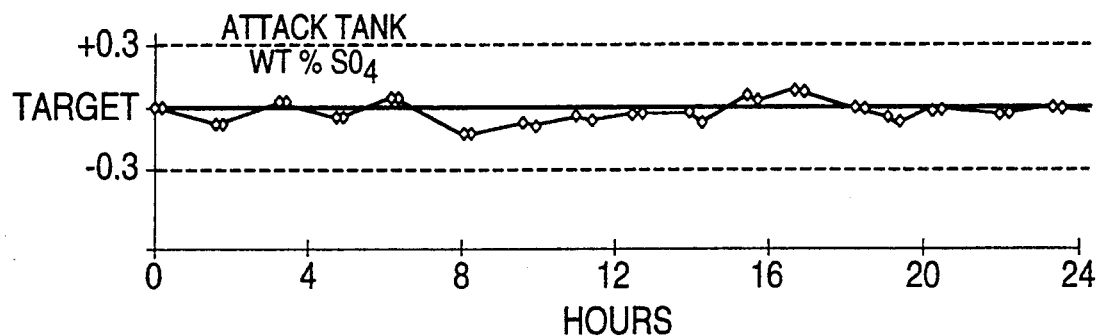
Figure 17:
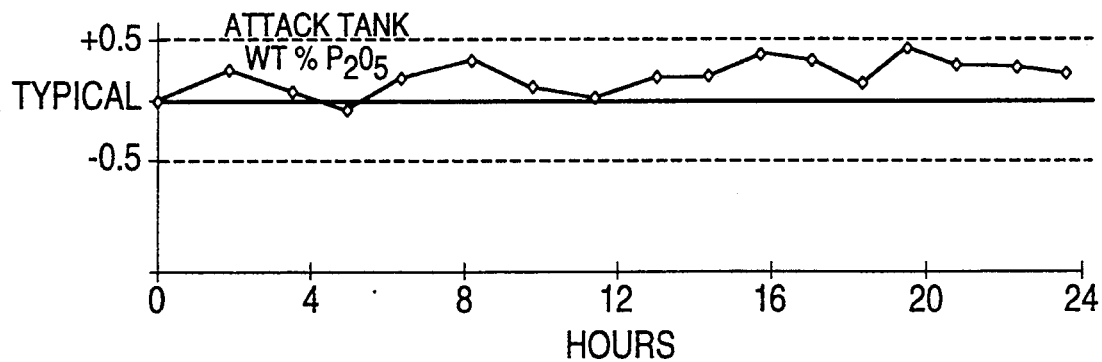

As shown in FIG. 12, first pass filtrate specific gravity increased significantly at about 1 hour. As filter feed rate decreased, attack tank level increased. The attack tank level increase caused a decrease in rock feed rate. Throughout this period, both attack tank sulfate and $P_2O_5$ concentrations were controlled to remain well within acceptable limits.

The bypass rate typically was at the minimum flow level, but increased significantly for short periods at 4 hours, 6 hours, and 8 hours. These increases were required because the attack tank level was below the minimum desired level. Note that rock feed rate also increased, and indeed was precluded from decreasing, during the periods when attack tank level was below the minimum desired level.

At about 11 hours, the first pass filtrate specific gravity target was increased. In response, filter feed rate and rock feed rate increased. Because the $P_2O_5$ concentration in the attack tank was slightly above target, bypass water was added to the attack tank. Because the attack tank level had fallen below the minimum desired level, rock feed rate decreases were precluded. However, at about 13 hours, when the attack tank level returned to the minimum desirable level, rock rate was allowed to decrease and did in fact decrease. Also, bypass flow rate again returned to the minimum level.

I claim:

1. A method for providing maximum throughput of a wet process phosphoric acid plant at a fixed rate of recovery comprising:
   a. supplying phosphate ore and water to an attack tank in which the ore is reacted in an acidic solution comprising sulfuric acid and phosphoric acid to obtain a product slurry comprising calcium sulfate in aqueous phosphoric acid solution;
   b. separating the slurry by filtration to form a calcium sulfate filter cake and an aqueous phosphoric acid solution product;
   c. rinsing the filter cake in at least one stage to form phosphoric acid-containing return acid solution by rinsing the filter cake in an ultimate stage with rinse water to form a first pass filtrate, then rinsing filter cake in a penultimate stage with the first pass filtrate, and continuing to rinse filter cake stages in sequence with filtrate from a subsequent stage until filter cake in all stages has been rinsed, the filtrate from the last rinsing forming the return acid solution;
   d. returning the return acid solution to the attack tank;
   e. controlling the filter feed to give a desired specific gravity of the first pass filtrate, said control comprising
      i. determining the average specific gravity of the first pass filtrate and the average rate at which product slurry is introduced to the filter over a predetermined period;
      ii. determining the difference between the average specific gravity of the first pass filtrate and a predetermined desired specific gravity;
      iii. calculating a correction to the product slurry rate based on the difference to cause the average specific gravity of the first pass filtrate to equal the desired specific gravity;
      iv. controlling the rate at which phosphate ore, sulfuric acid, return acid, and water are added to the attack tank to maintain a predetermined attack tank level and a predetermined concentration of sulfate in the attack tank; and
   f. controlling the rate at which rinse water is added to the filter and the rate at which water is added to the attack tank to provide a quantity of return acid sufficient to achieve a predetermined phosphoric acid concentration in the aqueous phosphoric acid solution product.

2. The method of claim 1 wherein the average specific gravity of the first pass filtrate is greater than the specific gravity of the rinse water by between about 0.03 and 0.15.

3. The method of claim 1, further comprising a method for maintaining a predetermined excess sulfate concentration in the attack tank comprising
   g. calculating the total quantity of sulfuric acid, the total quantity of phosphate ore, and the total quantity of water added to the attack tank during a predetermined period;

h. calculating a new sulfuric acid feed rate to cause excess sulfate to have the predetermined value of excess sulfate;

i. calculating the quantity of sulfuric acid to be added to or subtracted from the sulfuric acid feed rate to correct any difference between the sulfate concentration in the reactor and the predetermined excess sulfate concentration; and j. adjusting the sulfuric acid feed rate to the attack tank by pulsing said acid feed rate then allowing the ram to decay to the new sulfuric acid feed rate.

4. The method of claim 1, further comprising controlling the quantity of water supplied to the attack tank from the addition of aqueous sulfuric acid, return acid solution, and water added directly to the attack tank comprising k. calculating a theoretical quantity of water which, when added to the attack tank, maximizes recovery of phosphoric acid;

l. controlling the quantity of rinse water to maximize the recovery of the return acid solution from the cake by pulsing the flow rate of the rinse water a plurality of times in a predetermined minor amount relative to the rinse water flow for a predetermined interval to determine the quantity of rinse water required to maximize the recovery of phosphoric acid from the cake;

m. measuring the amount of rinse water delivered to the attack tank in the returned acid solution; and n. adjusting the quantity of water added to the attack tank to achieve addition of the theoretical quantity required in step (k) by controlling the sulfuric acid concentration, the quantity of rinse water from step (l) and the amount of water delivered to the attack tank measured in step (m), and the quantity of water added directly to the attack tank.

5. The method of claim 3, further comprising controlling the quantity of water supplied to the attack tank from the addition of aqueous sulfuric acid, return acid solution, and water added directly to the attack tank comprising k. calculating a theoretical quantity of water which, when added to the attack tank, maximizes recovery of phosphoric acid;

l. controlling the quantity of rinse water to maximize the recovery of the return acid solution from the cake by pulsing the flow rate of the rinse water a plurality of times in a predetermined minor amount relative to the rinse water flow for a predetermined interval to determine the quantity of rinse water required to maximize the recovery of phosphoric acid from the cake;

m. measuring the amount of rinse water delivered to the attack tank in the returned acid solution; and n. adjusting the quantity of water added to the attack tank to achieve addition of the theoretical quantity required in step (k) by controlling the sulfuric acid concentration, the quantity of rinse water from step (l) and the amount of water delivered to the attack tank measured in step (m), and the quantity of water added directly to the attack tank.

6. The method of claim 4, further comprising o. determining a volume difference between the volumetric flows in to and out of the attack tank over a predetermined period;

p. determining the difference in attack tank level at the start and end of the predetermined period of step (o);

q. determining that portion of the quantity of water to be added to the attack tank in step (n) which is added directly to the attack tank; and s. adjusting the rate at which phosphate ore is introduced to the attack tank to maximize the flow rate of phosphate ore.

7. The method of claim 5, further comprising o. determining a volume difference between the volumetric flows in to and out of the attack tank over a predetermined period;

p. determining the difference in attack tank level at the start and end of the predetermined period of step (o); q. determining that portion of the quantity of water to be added to the attack tank in step (n) which is added directly to the attack tank; and s. adjusting the rate at which phosphate ore is introduced to the attack tank to maximize the flow rate of phosphate ore.

8. The method of claim 6, further comprising t. comparing the attack tank level to predetermined minimum and maximum levels; and u. limiting the adjustment to the rate at which phosphate ore is introduced to the attack tank if the attack tank level is less than the predetermined minimum level or is greater than the predetermined maximum level.

9. The method of claim 7, further comprising t. comparing the attack tank level to predetermined minimum and maximum levels; and u. limiting the adjustment to the rate at which phosphate ore is introduced to the attack tank if the attack tank level is less than the predetermined minimum level or is greater than the predetermined maximum level.

* * * * *